US012221948B2

(12) United States Patent
Kim

(10) Patent No.: US 12,221,948 B2
(45) Date of Patent: Feb. 11, 2025

(54) POWER GENERATION APPARATUS

(71) Applicant: Jin Young Kim, Gyeongsangbuk-do (KR)

(72) Inventor: Jin Young Kim, Gyeongsangbuk-do (KR)

( * ) Notice: Subject to any disclaimer, the term of this patent is extended or adjusted under 35 U.S.C. 154(b) by 0 days.

(21) Appl. No.: 18/265,340

(22) PCT Filed: Dec. 13, 2021

(86) PCT No.: PCT/KR2021/018881
§ 371 (c)(1),
(2) Date: Jun. 5, 2023

(87) PCT Pub. No.: WO2022/154276
PCT Pub. Date: Jul. 21, 2022

(65) Prior Publication Data

US 2024/0110539 A1 Apr. 4, 2024

(30) Foreign Application Priority Data

Jan. 13, 2021 (KR) ........................ 10-2021-0004591

(51) Int. Cl.
*F03B 13/10* (2006.01)
*F03B 17/06* (2006.01)

(52) U.S. Cl.
CPC .............. *F03B 13/10* (2013.01); *F03B 17/06* (2013.01); *F05B 2210/132* (2013.01); *F05B 2270/602* (2013.01)

(58) Field of Classification Search
CPC ................................ F03B 13/10; F03B 17/06
See application file for complete search history.

(56) References Cited

U.S. PATENT DOCUMENTS 5,584,179 A * 12/1996 Isa ............................ F04F 1/06 60/370
6,051,892 A * 4/2000 Toal, Sr. ............... F03B 17/005 290/43

(Continued)

FOREIGN PATENT DOCUMENTS

JP 2012-237301 A 12/2012
KR 10-2013-0089485 A 8/2013

(Continued)

OTHER PUBLICATIONS

Machine Translation of KR20140087948 (Year: 2014).*

*Primary Examiner* — Tulsidas C Patel
*Assistant Examiner* — Thomas K Quigley
(74) *Attorney, Agent, or Firm* — KORUS Patent, LLC; Seong Il Jeong

(57) ABSTRACT

The present invention relates to a power generation apparatus. A power generation apparatus including according to an embodiment of the present invention includes: a main chamber provided with a main space for the accommodation of water, and configured to accommodate water sucked through a suction pipe on the bottom surface thereof; a support part; an auxiliary chamber configured to receive water from the main chamber or to supply water to the main chamber; a pressure pump configured to generate pressure and thus discharge air in the main space out of the main chamber through a discharge pipe provided on the ceiling surface of the main chamber; a spout part configured to spout water, sucked by the pressure pump and accommodated in the main space, out of the main chamber; and a power generation part configured to generate electric power using the pressure of water spouted by the spout part.

6 Claims, 18 Drawing Sheets

(56) References Cited

U.S. PATENT DOCUMENTS

| | | | | |
|---|---|---|---|---|
| 6,546,723 | B1* | 4/2003 | Watten | F03B 13/00 60/398 |
| 8,127,542 | B1* | 3/2012 | Dolcimascolo | F03B 17/005 60/398 |
| 9,157,332 | B2* | 10/2015 | Hanna | F03B 17/02 |
| 10,844,828 | B2* | 11/2020 | Huebner | F03B 7/003 |
| 2001/0025653 | A1* | 10/2001 | Takura | E03B 11/02 137/255 |
| 2005/0279085 | A1* | 12/2005 | Moore | F03B 13/185 60/398 |
| 2009/0152871 | A1* | 6/2009 | Ching | F03G 7/00 415/916 |
| 2009/0293812 | A1* | 12/2009 | Arita | A01K 63/006 119/226 |
| 2009/0301587 | A1* | 12/2009 | Takagi | F25C 1/24 62/340 |
| 2012/0019009 | A1* | 1/2012 | Fong | F01K 25/06 290/1 R |
| 2012/0058405 | A1* | 3/2012 | Kirchoff | C25B 15/02 290/1 R |
| 2013/0111887 | A1* | 5/2013 | Kwok | F03B 17/02 60/325 |
| 2014/0070533 | A1* | 3/2014 | Li | F01K 25/08 290/2 |
| 2017/0113194 | A1 | 4/2017 | Katz | |
| 2022/0065214 | A1* | 3/2022 | Kim | F03B 13/06 |
| 2022/0356863 | A1* | 11/2022 | Shintani | F03B 13/144 |
| 2022/0403814 | A1* | 12/2022 | Smith | F03B 13/264 |
| 2023/0304466 | A1* | 9/2023 | Smith | F03B 17/06 |

FOREIGN PATENT DOCUMENTS

| | | | |
|---|---|---|---|
| KR | 10-2014-0087948 | A | 7/2014 |
| KR | 10-2020-0091511 | A | 7/2020 |

* cited by examiner

POWER GENERATION APPARATUS

TECHNICAL FIELD

The present invention relates to a power generation apparatus, and more particularly, to a power generation apparatus that is provided in an expandable form and generates electric power by dropping collected water.

BACKGROUND ART

Since energy resources and energy generation mainly depend on natural resources or energy resources such as passive natural power or nuclear energy, this causes the depletion and shortage of energy resources as well as dangerous environmental pollution and social problems.

It is considerably difficult to overcome not only the depletion and shortage of energy resources but also the environmental pollution and the social problems using limited natural resources such as coal and oil, passive natural power such as hydropower, wind power and solar power, or dangerous energy resources such as nuclear power.

In order to overcome the above various energy problems, there is a demand for the emergence of an invention that enables environmentally-friendly alternative energy to be produced as electric power.

DISCLOSURE

Technical Problem

The technical problem to be solved by the present invention is to provide a power generation apparatus.

The technical problems of the present invention are not limited to the technical problem mentioned above, and other technical problems not mentioned will be clearly understood by those having ordinary skill in the art from the following description.

Technical Solution

According to an embodiment of the present invention, there is provided a power generation apparatus including: a main chamber provided with a main space for the accommodation of water, and configured to accommodate water sucked through a suction pipe on the bottom surface thereof, a support part mounted at the main chamber and configured such that the bottom surface of the main chamber is kept separated from the ground by a predetermined distance when the support part is fixed to the ground at a point where river water or stream water is located so that the bottom surface of the main chamber and the suction pipe are placed below the water surface of river water or stream water; an auxiliary chamber supported by the main chamber, provided with an auxiliary space for the accommodation of water, and configured to receive water from the main chamber or to supply water to the main chamber; a vacuum pump configured to discharge air in the main space out of the main chamber through a discharge pipe provided on the ceiling surface of the main chamber; a spout part provided on a side surface of the main chamber, and configured to spout water, sucked by the vacuum pump and accommodated in the main space, out of the main chamber; and a power generation part configured to generate electric power using the pressure of water spouted by the spout part.

The main chamber may include a main outlet configured to supply water to the auxiliary chamber and a main inlet configured to receive water from the auxiliary chamber, and the main outlet may be disposed above the main inlet.

The auxiliary chamber may include: a first auxiliary inlet connected to the main outlet and configured to receive water from the main chamber; and a first auxiliary outlet connected to the main inlet and configured to supply water to the main chamber.

The first auxiliary inlet may be configured to receive water from another auxiliary chamber, and the first auxiliary outlet may be configured to supply water to the other auxiliary chamber.

The main chamber may further include a main opening/closing part configured to allow the movement of water from the outside of the main chamber to the inside of the main chamber through the main inlet but block the movement of water from the inside of the main chamber to the outside of the main chamber through the main inlet.

The auxiliary chamber may include a second auxiliary outlet configured to supply water to another auxiliary chamber and a second auxiliary inlet configured to receive water from the other auxiliary chamber, and the second auxiliary outlet is disposed above the second auxiliary inlet.

The auxiliary chamber may further include an auxiliary opening/closing part configured to allow the movement of water from the outside of the auxiliary chamber to the inside of the auxiliary chamber through the second auxiliary inlet but to block the movement of water from the inside of the auxiliary chamber to the outside of the auxiliary chamber through the second auxiliary inlet.

The power generation apparatus may further include a vortex generation part disposed adjacent to the discharge pipe and configured to cause air in the main space to generate a vortex and flow into the discharge pipe.

The power generation apparatus may further include an auxiliary power generation part connected to the auxiliary chamber and configured to receive water at a remote high location.

Details of other embodiments are included in the detailed description and the drawings.

BEST MODE

Hereinafter, preferred embodiments of the present invention will be described in detail with reference to the accompanying drawings. Advantages and features of the present invention and methods for achieving them will become apparent from the embodiments described below in detail in conjunction with the accompanying drawings. However, the present invention is not limited to the embodiments disclosed below, and may be implemented in a variety of different forms. These embodiments are provided only to complete the disclosure of the present invention and to fully inform those having ordinary skill in the art to which the present invention pertains of the scope of the invention. The invention is only defined by the scope of the claims. Like reference numbers designate like components throughout the specification.

Unless otherwise defined, all the terms (including technical and scientific terms) used in this specification may be used to have meanings commonly understood by those having ordinary skill in the art to which the present invention pertains. In addition, the terms defined in commonly used dictionaries are not interpreted ideally or excessively unless explicitly specifically defined.

Figure 1:
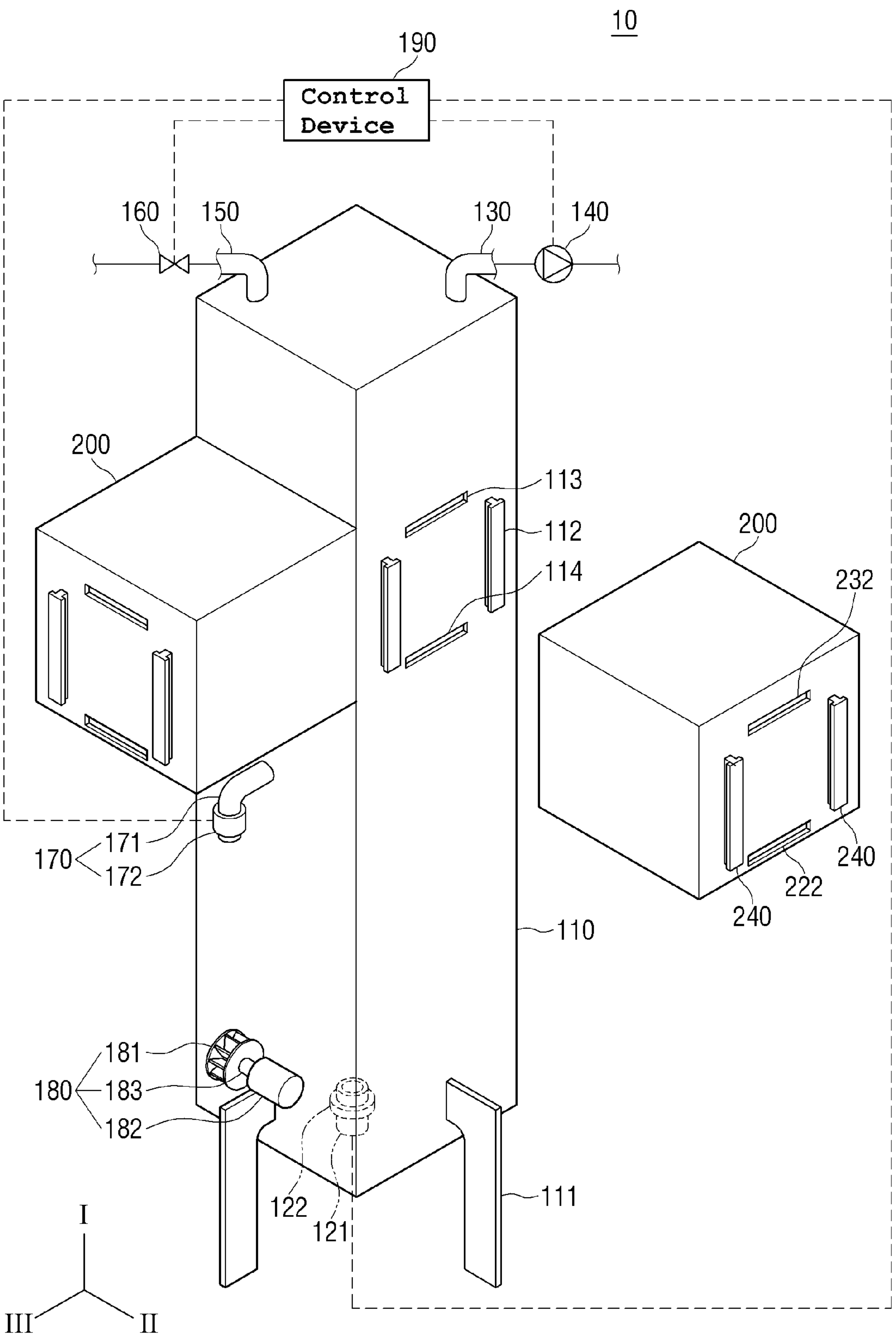
FIG. 1 is a diagram showing a power generation apparatus according to an embodiment of the present invention.
Figure 2:
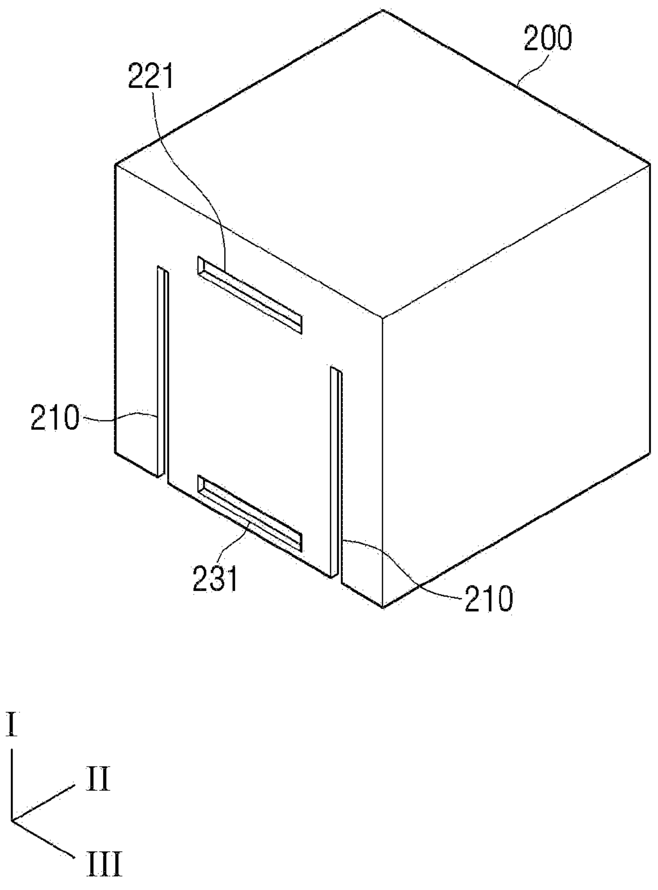
FIG. 2 is a diagram showing the auxiliary chamber shown in FIG. 1.

FIG. 1 is a diagram showing a power generation apparatus according to an embodiment of the present invention, and FIG. 2 is a diagram showing the auxiliary chamber shown in FIG. 1.

Referring to FIGS. 1 and 2, a power generation apparatus 10 includes a main chamber 110, a support part 111, a suction pipe 121, a suction valve 122, a discharge pipe 130, a vacuum pump 140, an inlet pipe 150, an inlet valve 160, a spout part 170, a generation part 180, a control device 190, and an auxiliary chamber 200.

The main chamber 110 serves to contain water. To this end, the main chamber 110 may include a main space for accommodating water. The suction pipe 121 may be provided on the bottom surface of the main chamber 110. The suction pipe 121 may provide a movement path for water sucked into the main space of the main chamber 110. The bottom surface of the main chamber 110 may be parallel to a water surface, and the cross-sectional area of the main chamber 110 may be formed to be larger than that of the suction pipe 121. The main chamber 110 may accommodate water sucked through the suction pipe 121.

The main chamber 110 may be fixed to the ground by the support part 111. In the present invention, the ground may be understood as the top surface of the ground (GR) supporting river water or stream water at a point where the river water or the stream water is located. As a result, in the present invention, the power generation apparatus 10 is installed at a point where river water or stream water is located, and generates power. The support part 111 serves to fix the main chamber 110 to the ground GR at the point where river water or stream water is located so that the bottom surface of the main chamber 110 is spaced apart from the ground GR by a predetermined distance and the bottom surface of the main chamber 110 and the suction pipe 121 are placed below the surface of the river water or the stream water. Hereinafter, the point at which river water or stream water is located and power is generated by the power generating apparatus 10 of the present invention is referred to as a power generation point.

The main chamber 110 may have a long shape in a direction perpendicular to the ground. Hereinafter, a direction perpendicular to the ground is referred to as a first direction I, a direction perpendicular to the first direction I and parallel to the ground is referred to as a second direction II, and a direction perpendicular to the first direction I and the second direction II is referred to as a third direction III.

Alternatively, according to some embodiments of the present invention, the main chamber 110 may have a wide shape parallel to the ground. That is, the external shape of the main chamber 110 may be longer in the second direction II and in the third direction III than in the first direction I. Hereinafter, the main chamber 110 having a long shape in the first direction I will be mainly described.

Although FIG. 1 shows a main chamber 110 having a long rectangular column shape in the first direction I, the shape of the main chamber 110 of the present invention is not limited to the rectangular column, and may be a polygonal column including a plurality of planar side surfaces or a circular column. However, as will be described later, the main chamber 110 and the auxiliary chamber 200 may be disposed in close contact with each other. For this purpose, it is preferable that the contact surfaces of the main chamber 110 and the auxiliary chamber 200 are formed to be the same as each other. Hereinafter, a case where the shape of the main chamber 110 is a square column will be mainly described.

The discharge pipe 130 may be provided on the ceiling surface of the main chamber 110. The discharge pipe 130 may provide a path for discharging air, accommodated in the main space of the main chamber 110, to the outside. The cross-sectional area of the ceiling surface of the main chamber 110 may be formed to be larger than the cross-sectional area of the discharge pipe 130. The vacuum pump 140 may be connected to one end of the discharge pipe 130. The vacuum pump 140 serves to discharge air in the main space out of the main chamber 110 through the discharge pipe 130 provided on the ceiling surface of the main chamber 110. More specifically, air present in the upper space of the main space may be discharged out of the main chamber 110 through the discharge pipe 130 by the pressure of the vacuum pump 140.

As air present in the upper space of the main space is discharged out of the main chamber 110 by the vacuum pump 140, water may be sucked into the main chamber 110 through the suction pipe 121. When the main chamber 110 is installed at the power generation point, the bottom surface of the main chamber 110 and the suction pipe 121 may be located below the surface of the water. That is, a portion of the lower portion of the main chamber 110 may be submerged in water. Accordingly, in the case where air present in the upper space of the main space is discharged out of the main chamber 110 by the vacuum pump 140, as pressure inside the main chamber 110 is reduced compared to the external pressure based on the bottom surface of the main chamber 110 and the suction pipe 121, water may be sucked into the main chamber 110 through the suction pipe 121 and rise up to the top surface of the main chamber 110.

The suction valve 122 may be provided in the suction pipe 121. The intake valve 122 may selectively open and close the intake pipe 121. When the suction valve 122 opens the suction pipe 121, water may be sucked into the main chamber 110 through the suction pipe 121. When the suction valve 122 closes the suction pipe 121, the movement of water through the suction pipe 121 may be blocked.

The spout part 170 is provided on a side of the main chamber 110, and serves to spout water, sucked by the vacuum pump 140 and accommodated in the main space, out of the main chamber 110.

The spout part 170 includes a spout pipe 171 and a spout adjustment unit 172. The spout pipe 171 may provide a path for water spouted out of the main chamber 110. One side of the spout pipe 171 may be connected to the side of the main chamber 110. Accordingly, the spout pipe 171 may provide a path for water discharged from the side of the main chamber 110 and connected to the power generation unit 180.

The spout adjustment unit 172 serves to adjust the amount of water spouted through the spout pipe 171. The spout adjustment unit 172 may close the spout pipe 171 so that no water is spouted, may partially open the injection pipe 171 so that a small amount of water is spouted, or may completely open the spout pipe 171 so that a large amount of water is spouted.

A spout hole through which water is spouted from the spout pipe 171 may face the ground. Accordingly, water spouted from the spout part 170 may fall through a connection pipe (not shown) connected to the power generation part 180 or toward the ground directly from the spout part 170.

The power generation unit 180 serves to generate power with the pressure of water sprayed by the spout part 170. The power generation unit 180 includes a rotation unit 181 and a power generation unit 182. The rotation unit 181 may be rotated by the force of water spouted by the spout part 170. In order to receive the power of water, the rotation unit 181 may have a plurality of blades. As water exerts impact on one-side surfaces of the blades, the rotation unit 181 may be rotated. In particular, in the present invention, the spout part 170 may be provided above the rotation unit 181. The rotation unit 181 may be rotated by the force of water falling from the spout part 170.

The power generation unit 182 serves to convert the rotational force of the rotation unit 181 into electric power. A rotation shaft 183 may be provided between the rotation unit 181 and the power generation unit 182 to transmit the rotational force of the rotation unit 181 to the power generation unit 182.

A part of the rotation shaft 183 may be accommodated inside the power generation unit 182. A coil (not shown) may be wound around the rotation shaft 183 accommodated inside the power generation unit 182, and a permanent magnet (not shown) may be provided inside the power generation unit 182 along the edge of the coil. When the rotating shaft 183 is rotated, a flow of current may be generated through the coil. Since the detailed internal structure of the power generation unit 182 is out of the scope of the present invention, a detailed description thereof will be omitted.

The power generated by the power generation unit 182 may be delivered to and consumed in a power consumption site (not shown), or may be delivered to and stored in a power storage site (not shown).

The inlet pipe 150 may be provided on the ceiling surface of the main chamber 110. The inlet pipe 150 may provide a path for external air introduced into the main space of the main chamber 110. The inlet valve 160 may be provided in the inlet pipe 150. The inlet valve 160 may selectively open and close the inlet pipe 150. When the inlet valve 160 opens the inlet pipe 150, external air may be introduced into the main chamber 110 through the inlet pipe 150. When the inlet valve 160 closes the inlet pipe 150, the inflow of external air through the inlet pipe 150 may be blocked.

The inlet pipe 150 serves to make the spout of water through the spout part 170 more smooth. When the distance to the surface of the water accommodated in the main space of the main chamber 110 based on the surface of water present around the main chamber 110 at the power generation point is not sufficiently long (for example, when the distance is less than 10 m), the spout of water through the spout hole may not be smooth even when the spout hole is opened. The internal and external pressures of the main chamber 110 are similarly formed such that water cannot be smoothly discharged through the spout hole.

When the inlet pipe 150 is opened and external air flows into the main chamber 110, the pressure inside the main chamber 110 becomes higher than that of the outside, so that water can be smoothly discharged through the spout hole.

The control device 190 serves to control the suction valve 122, the vacuum pump 140, the inlet valve 160, and the spout adjustment unit 172 according to input control commands. For example, when a control command to accommodate water in the main chamber 110 is input, the control device 190 may control the suction valve 122 so that the suction pipe 121 is opened, may operate the vacuum pump 140, may control the inlet valve 160 so that the inlet pipe 150 is closed, and may control the spout adjustment unit 172 so that the spout pipe 171 is opened. Furthermore, when a control command to generate power is input, the control device 190 may control the suction valve 122 so that the suction pipe 121 is closed, may stop the operation of the vacuum pump 140, may control the inlet valve 160 so that the inlet pipe 150 is opened, and may control the spout adjustment unit 172 so that the spout pipe 171 is opened.

Furthermore, the control device 190 may perform a crossing command for a control command to accommodate water and a control command to generate power.

The control device 190 may be disposed adjacent to the main chamber 110, or may be disposed remotely from the main chamber 110. A user may input a control command to the control device 190. The control device 190 may control the suction valve 122, the vacuum pump 140, the inlet valve 160, and the spout adjustment unit 172 according to input control commands input from the user. In this case, the user may input a detailed adjustment command to the spout adjustment unit 172. For example, the user may input an adjustment command specifying the degree of opening of the spout pipe 171, and the control device 190 may operate the spout adjustment unit 172 so that the spout pipe 171 is opened according to the input adjustment command.

The auxiliary chamber 200 is supported by the main chamber 110, is provided with an auxiliary space for accommodating water, and serves to receive water from the main chamber 110 or supply water to the main chamber 110. Part of the water introduced into the main chamber 110 may move to the auxiliary chamber 200 and be accommodated in the auxiliary chamber 200, and the water accommodated in the auxiliary chamber 200 may be supplied to the main chamber 110 and be used for power generation.

For the coupling between the main chamber 110 and the auxiliary chamber 200, the main chamber 110 may have main coupling protrusions 112, and the auxiliary chamber 200 may include auxiliary coupling slits 210. The main chamber 110 and the auxiliary chamber 200 may be engaged with each other using the main coupling protrusions 112 and the auxiliary coupling slits 210, and additional coupling using a bolt or welding may be performed thereon.

The main chamber 110 may include main outlets 113 and main inlets 114. The main outlets 113 may be configured to supply water to the auxiliary chamber 200. The main inlets 114 may be configured to receive water from the auxiliary chamber 200. The main outlets 113 may be disposed above the main inlets 114.

The auxiliary chamber 200 may include a first auxiliary inlet 221, a second auxiliary inlet 222, a first auxiliary outlet 231, a second auxiliary outlet 232, and auxiliary coupling protrusions 240.

The first auxiliary inlet 221 may be connected to the main outlet 113 and may be configured to receive water from the main chamber 110. The first auxiliary outlet 231 may be connected to the main inlet 114, and may be configured to supply water to the main chamber 110.

When the auxiliary chamber 200 is coupled to the main chamber 110, the main outlet 113 of the main chamber 110 and the first auxiliary inlet 221 of the auxiliary chamber 200 may be connected to each other, and the main inlet 114 of the main chamber 110 and the first auxiliary outlet 231 of the auxiliary chamber 200 may be connected to each other. When the level of the water accommodated in the main chamber 110 reaches the main outlet 113, the water accommodated in the main chamber 110 is supplied to the auxiliary chamber 200 through the main outlet 113 and the first auxiliary inlet 221. Furthermore, when electric power is generated, water accommodated in the auxiliary chamber 200 may be supplied to the main chamber 110 through the first auxiliary outlet 231 and the main inlet 114.

The first auxiliary inlet 221 provided in the auxiliary chamber 200 may be configured to receive water from another auxiliary chamber 200, and the first auxiliary outlet 231 may be configured to supply water to the other auxiliary chambers 200. The auxiliary chamber 200 may be connected to the other auxiliary chamber 200, and may exchange water with the other auxiliary chamber 200.

The second auxiliary outlet 232 may be configured to supply water to another auxiliary chamber 200, and the second auxiliary inlet 222 may be configured to receive water from the other auxiliary chamber 200. The second auxiliary outlet 232 may be disposed above the second auxiliary inlet 222.

When the auxiliary chamber 200 is coupled to another auxiliary chamber 200, the second auxiliary outlet 232 of the auxiliary chamber 200 and the first auxiliary inlet 221 of the other auxiliary chamber 200 may be connected to each other, and the second auxiliary inlet 222 of the auxiliary chamber 200 and the first auxiliary outlet 231 of the other auxiliary chamber 200 may be connected to each other. When the level of the water accommodated in the auxiliary chamber 200 reaches the second auxiliary outlet 232, water accommodated in the auxiliary chamber 200 may be supplied to the other auxiliary chamber 200 through the second auxiliary outlet 232 of the auxiliary chamber 200 and the first auxiliary inlet 221 of the other auxiliary chamber 200. Furthermore, when power is generated, water accommodated in the other auxiliary chamber 200 may be supplied to the auxiliary chamber 200 through the first auxiliary outlet 231 of the other auxiliary chamber 200 and the second auxiliary inlet 222 of the auxiliary chamber 200.

The auxiliary coupling protrusions 240 may be used for coupling with other auxiliary chambers 200. The auxiliary chamber 200 and the other auxiliary chamber 200 are coupled to each other by engaging the auxiliary coupling protrusions 240 provided on the auxiliary chamber 200 and the auxiliary coupling slits 210 provided in the other auxiliary chamber 200 with each other.

Figure 3:
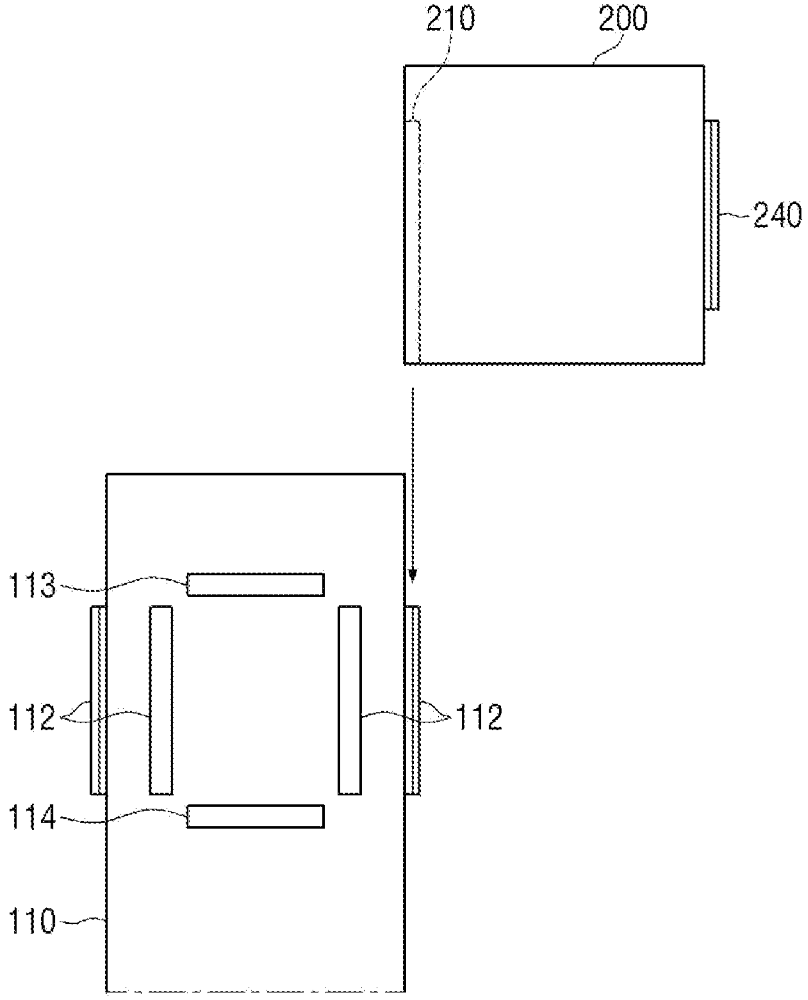
FIG. 3 is a diagram illustrating a state in which the auxiliary chamber is coupled to a main chamber.
Figure 4:
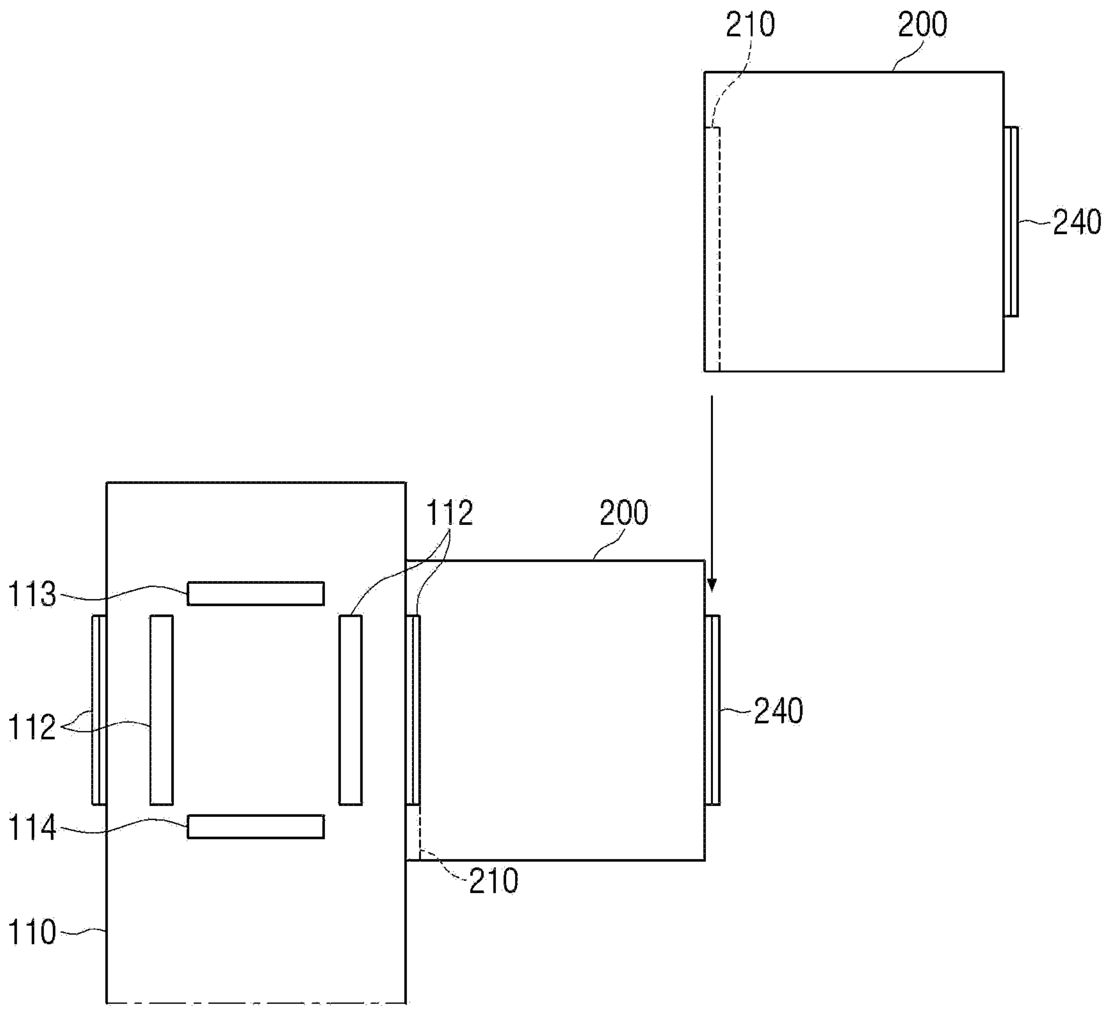
FIG. 4 is a diagram illustrating a state in which another auxiliary chamber is coupled to the auxiliary chamber.
Figure 5:
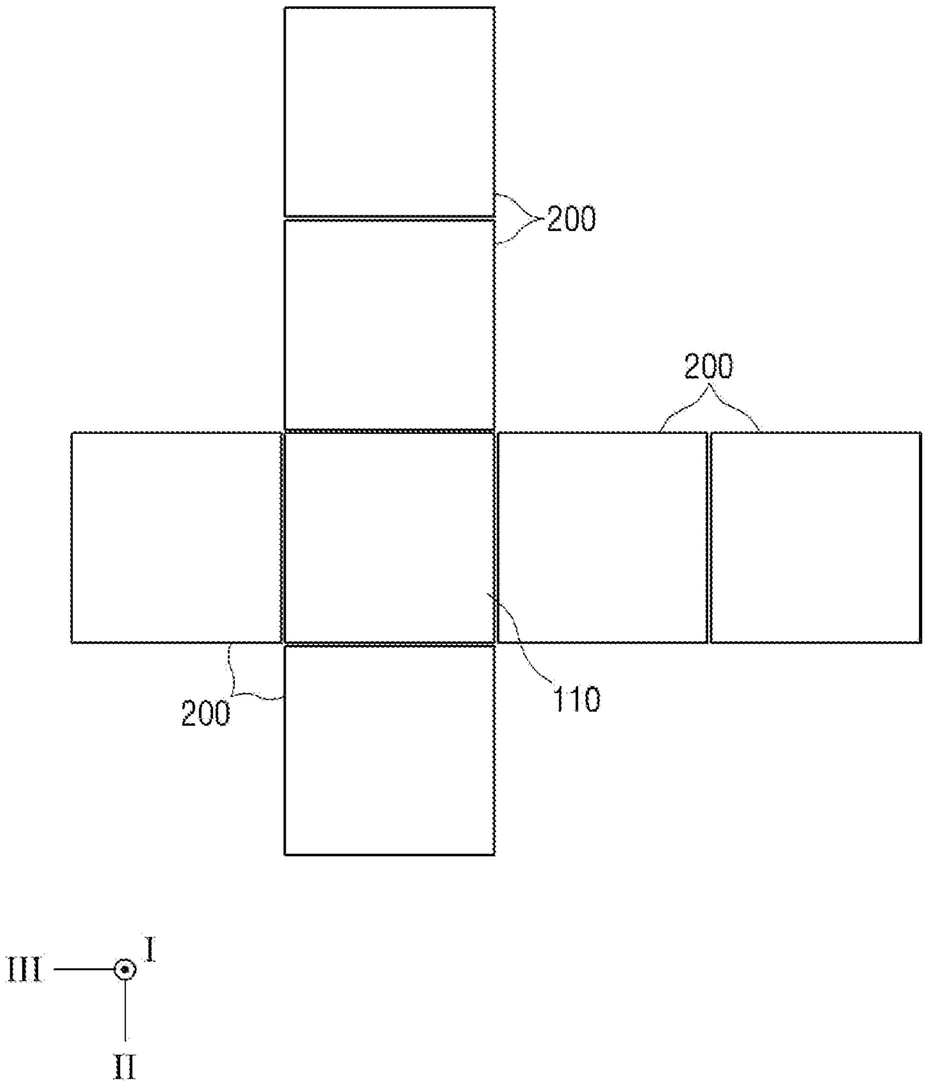
FIG. 5 is a diagram showing a power generation device in which a plurality of auxiliary chambers are coupled to each other.

FIG. 3 is a diagram illustrating a state in which the auxiliary chamber is coupled to the main chamber, FIG. 4 is a diagram illustrating a state in which another auxiliary chamber is coupled to the auxiliary chamber, and FIG. 5 is a diagram showing a power generation device in which a plurality of auxiliary chambers are coupled to each other.

Referring to FIG. 3, the main chamber 110 and the auxiliary chamber 200 may be engaged with each other.

While the auxiliary chamber 200 descends from a location above the main chamber 110, the main coupling protrusions 112 of the main chamber 110 and the auxiliary coupling slits 210 of the auxiliary chamber 200 may be engaged with each other. To more securely couple the main chamber 110 and the auxiliary chamber 200 to each other after the main coupling protrusions 112 and the auxiliary coupling slits 210 have been engaged with each other, coupling means such as a bolt or welding may be used.

Referring to FIG. 4, the auxiliary chamber 200 and another auxiliary chamber 200 may be engaged with each other.

Hereinafter, the auxiliary chamber 200 disposed closer to the main chamber 110 is referred to as a first auxiliary chamber 200, and the auxiliary chamber 200 disposed farther from the main chamber 110 is referred to as a second auxiliary chamber 200.

As the second auxiliary chamber 200 descends from a location above the first auxiliary chamber 200, the auxiliary coupling protrusions 240 of the first auxiliary chamber 200 and the auxiliary coupling slits 210 of the second auxiliary chamber 200 are engaged with each other. To more securely couple the first auxiliary chamber 200 and the second auxiliary chamber 200 to each other after the auxiliary coupling protrusions 240 and the auxiliary coupling slits 210 have been engaged with each other, a coupling means such as a bolt or welding may be used.

Referring to FIG. 5, a plurality of auxiliary chambers 200 may be coupled to the main chamber 110.

The main chamber 110 may include a plurality of sides. Auxiliary chambers 200 may be coupled to the respective sides. Furthermore, the second auxiliary chamber 200 may be coupled to the first auxiliary chamber 200 coupled to the main chamber 110. For example, when a natural or artificial object capable of supporting the auxiliary chamber 200, such as bedrock or the foot of a mountain, is provided near the power generation point where the power generation device 10 is installed, it may be possible to connect a plurality of auxiliary chambers side by side in a direction substantially parallel to the ground 200. At least one of the plurality of auxiliary chambers 200 connected side by side is supported by the supporting means, so that the power generation device 10 can stably maintain its posture.

Whether to install the auxiliary chamber 200 may be determined by taking into consideration an operation environment and an installation environment in combination. For example, when it is determined that power generation using only the main chamber 110 is insufficient, the auxiliary chamber 200 may be installed. Furthermore, when an additional auxiliary chamber 200 needs to be installed after the auxiliary chamber 200 has been installed, the additional auxiliary chamber 200 may be coupled to the main chamber 110 or to the previously installed auxiliary chamber 200.

Furthermore, after the auxiliary chamber 200 has been installed, it may be easily removed. That is, the auxiliary chamber 200 may be removed from the main chamber 110 by moving the auxiliary chamber 200 upward with respect to the main chamber 110. Alternatively, the second auxiliary chamber 200 may be removed from the first auxiliary chamber 200 by moving the second auxiliary chamber 200 upward with respect to the first auxiliary chamber 200.

Figure 6:
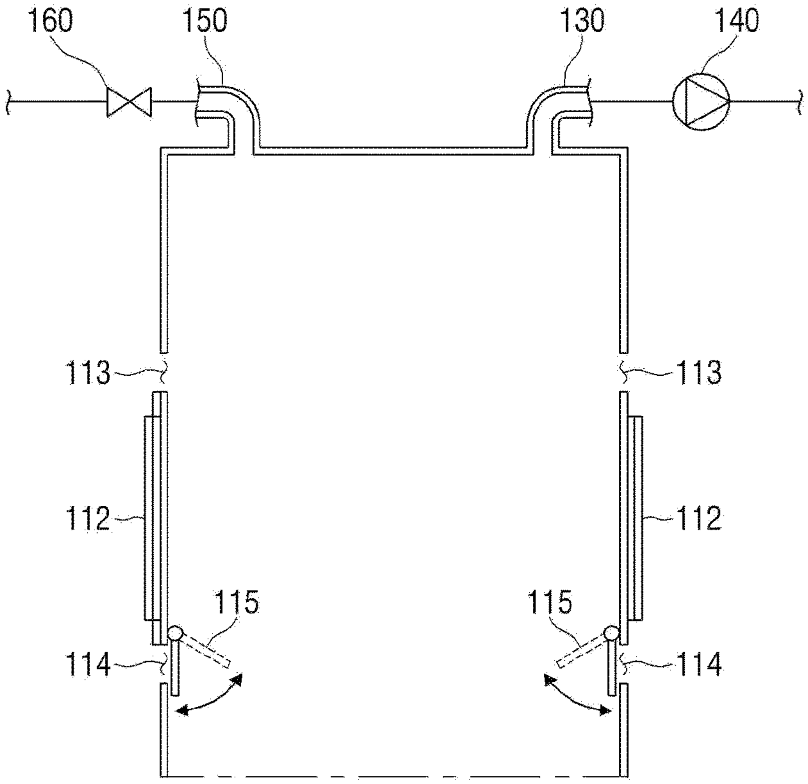
FIG. 6 is a diagram illustrating the operation of main opening/closing parts provided in the main chamber.

FIG. 6 is a diagram illustrating the operation of main opening/closing parts provided in the main chamber.

Referring to FIG. 6, the main opening/closing parts 115 may be provided in the main chamber 110. The main opening/closing parts 115 may allow the movement of water from the outside of the main chamber 110 to the inside thereof through the main inlets 114, but may block the movement of water from the inside of the main chamber 110 to the outside thereof through the main inlets 114.

When the external pressure of the main chamber 110 exceeds the internal pressure based on the main inlets 114, the main opening/closing parts 115 may open the main inlets 114. In contrast, when the external pressure of the main chamber 110 is equal to or lower than the internal pressure, the main opening/closing parts 115 may close the main inlets 114.

The main opening/closing parts 115 may each be provided in the form of a door, or may each be provided in the form of a check valve. Due to the main opening/closing parts 115, the movement of water from the main chamber 110 to the auxiliary chamber 200 through the main inlet 114 may be blocked, and the movement of water from the auxiliary chamber 200 to the main chamber 110 through the main inlet 114 may be allowed.

Figure 7:
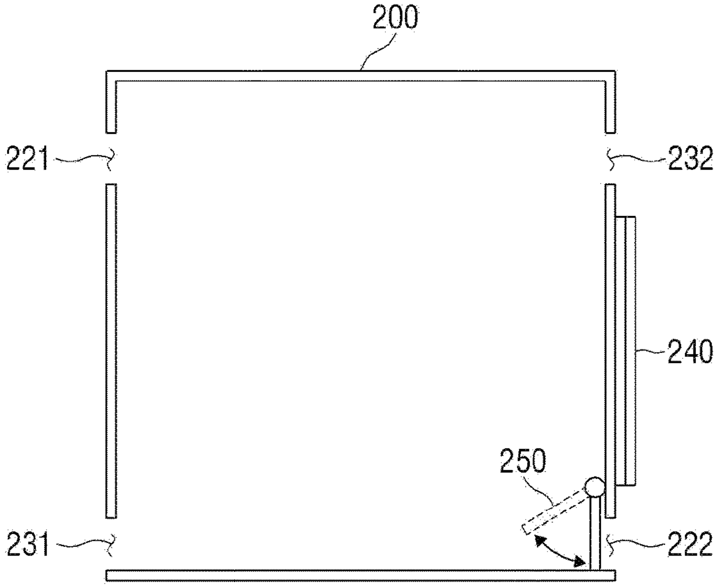
FIG. 7 is a diagram illustrating the operation of an auxiliary opening/closing part provided in the auxiliary chamber.

FIG. 7 is a diagram illustrating the operation of an auxiliary opening/closing part provided in an auxiliary chamber.

Referring to FIG. 7, an auxiliary opening/closing part 250 may be provided in the auxiliary chamber 200. The auxiliary opening/closing part 250 may allow the movement of water from the outside of the auxiliary chamber 200 to the inside thereof through the second auxiliary inlet 222 but block the movement of water from the inside of the auxiliary chamber 200 to the outside thereof through the second auxiliary inlet 222.

When the external pressure of the auxiliary chamber 200 exceeds the internal pressure based on the second auxiliary inlet 222, the auxiliary opening/closing part 250 may open the second auxiliary inlet 222. In contrast, when the external pressure of the auxiliary chamber 200 is equal to or lower than the internal pressure, the auxiliary opening/closing part 250 may close the second auxiliary inlet 222.

The auxiliary opening/closing part 250 may be provided in the form of a door, or may be provided in the form of a check valve. Due to the auxiliary opening/closing part 250, the movement of water from the first auxiliary chamber 200 to the second auxiliary chamber 200 through the second auxiliary inlet 222 may be blocked, and only the movement of water from the second auxiliary chamber 200 to the first auxiliary chamber 200 through the second auxiliary inlet 222 may be allowed.

Figure 8:
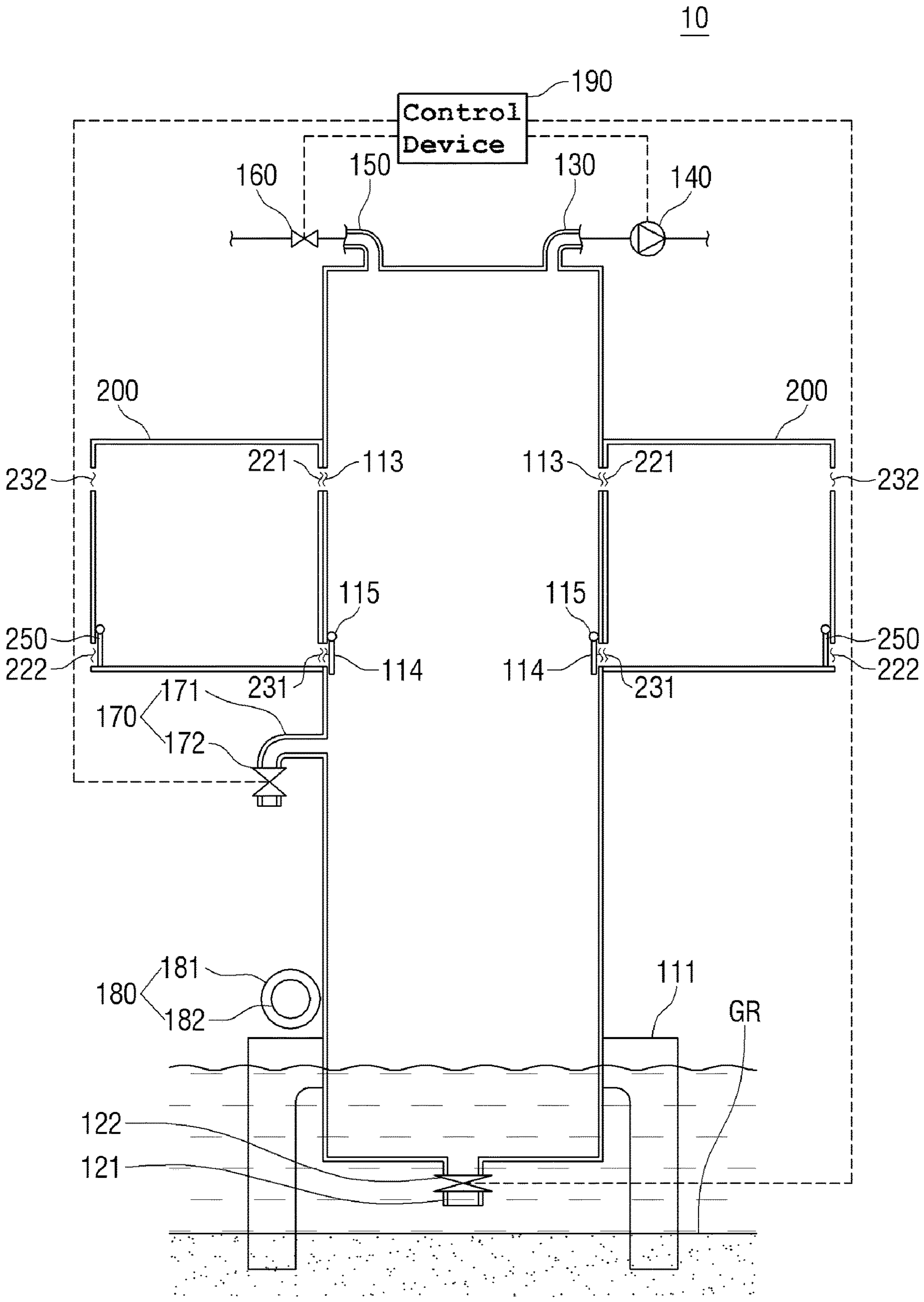
FIG. 8 is a diagram showing a state in which a power generation device is installed at a power generation point.

FIG. 8 is a diagram showing a state in which the power generation device is installed at a power generation point.

Referring to FIG. 8, the power generation device 10 may be installed at the power generation point. As the support part 111 of the power generation device 10 penetrates the ground GR, the power generation device 10 may be securely fixed at the power generation point. Furthermore, the bottom of the main chamber 110 may be kept spaced apart from the ground GR by a predetermined distance by the support part 111. Accordingly, the suction of water may be easily performed through the suction pipe 121.

Water may be present in the upper part of the ground GR. The position of the main chamber 110 may be determined such that the bottom surface and the suction pipe 121 are submerged in water. Furthermore, the posture of the main chamber 110 may be determined such that the long axis of the main chamber 110 is parallel to a direction perpendicular to the ground, i.e., the first direction I.

Figure 9:
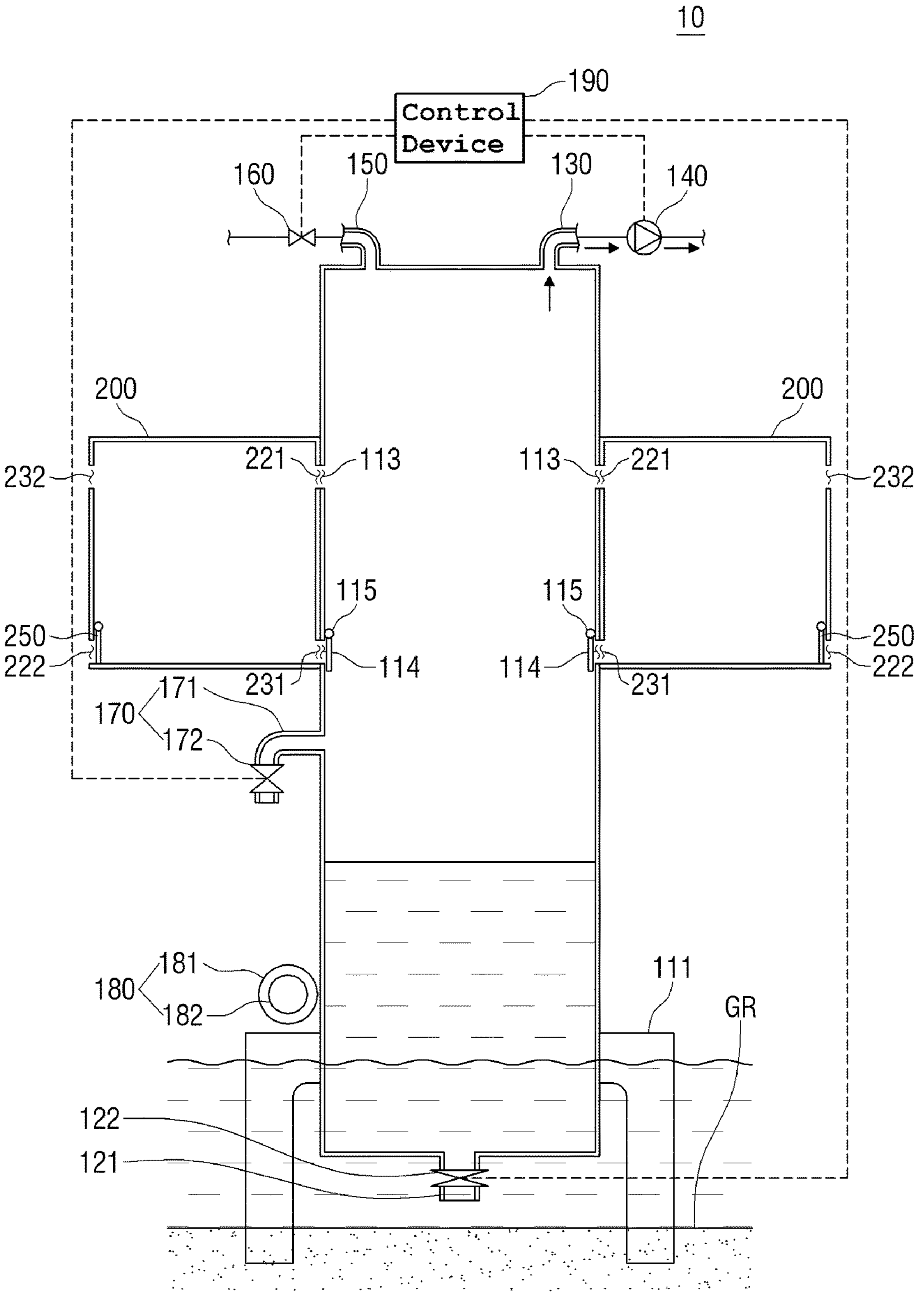
FIGS. 9 and 10 are diagrams showing a state in which water is sucked into the main chamber.
Figure 10:
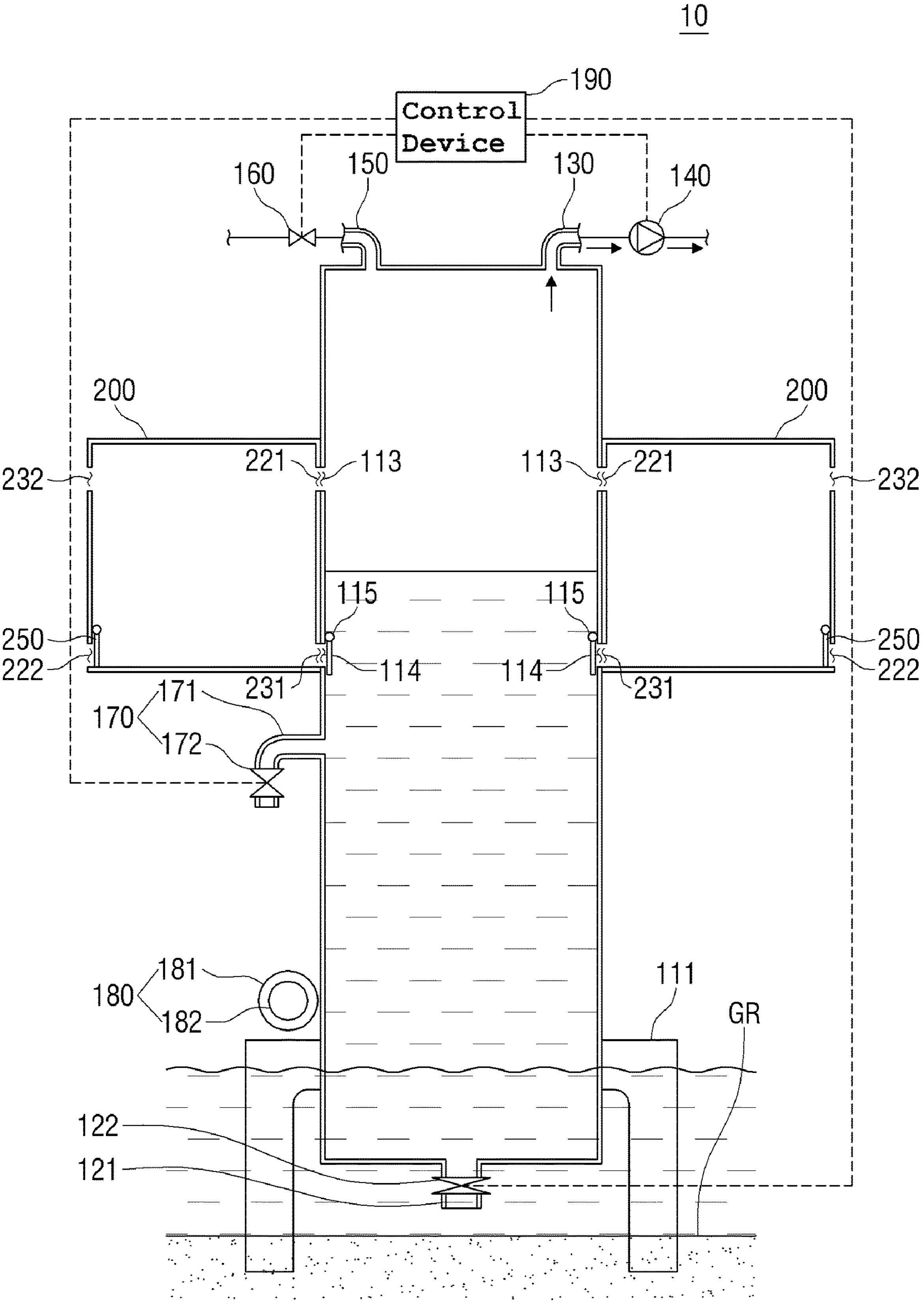

FIGS. 9 and 10 are diagrams showing a state in which water is sucked into the main chamber.

Referring to FIGS. 9 and 10, water may be sucked into the main space through the suction pipe 121 of the main chamber 110.

As the vacuum pump 140 operates, air present in the upper part of the main space may be discharged through the discharge pipe 130. Accordingly, the internal pressure of the main space becomes lower than the external pressure of the main space, and water may be sucked through the suction pipe 121 due a pressure reduction action attributable to the pressure difference. In this case, the suction valve 122 may open the suction pipe 121.

As shown in FIG. 10, even when the water surface of the main space is located above the main inlets 114, the main opening/closing parts 115 may not open the main inlets 114. Since the internal pressure of the main chamber 110 is higher than the external pressure, the main opening/closing parts 115 may keep the main inlets 114 closed. Accordingly, water in the main chamber 110 may be prevented from flowing into the auxiliary chamber 200 through the main inlet 114.

The suction of water may be performed until the surface of the water in the main space reaches the main outlets 113.

Figure 11:
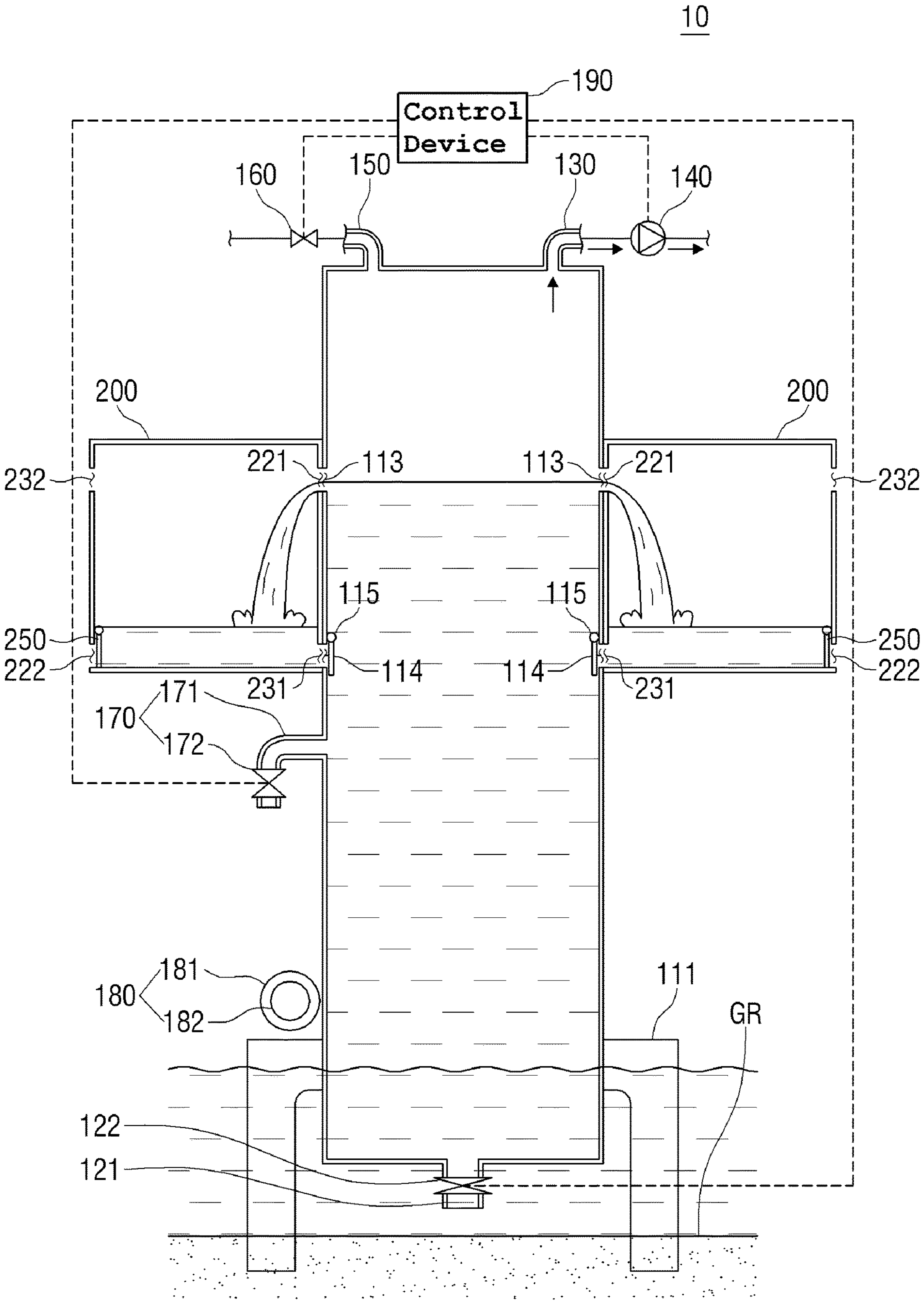
FIG. 11 is a diagram illustrating a state in which water is supplied from the main chamber to the auxiliary chamber.

FIG. 11 is a diagram illustrating a state in which water is supplied from the main chamber to the auxiliary chamber.

Referring to FIG. 11, water in the main chamber 110 may be supplied to the auxiliary chamber 200 through the main outlet 113 of the main chamber 110 and the auxiliary inlet of the auxiliary chamber 200.

When the level of water accommodated in the main chamber 110 reaches the main outlet 113, water in the main chamber 110 may be supplied to the auxiliary chamber 200. Even while the water in the main chamber 110 is supplied to the auxiliary chamber 200, the internal pressure of the main chamber 110 is higher than the external pressure based on the main inlets 114, so that the main opening/closing parts 115 may keep the main inlets 114 closed.

Figure 12:
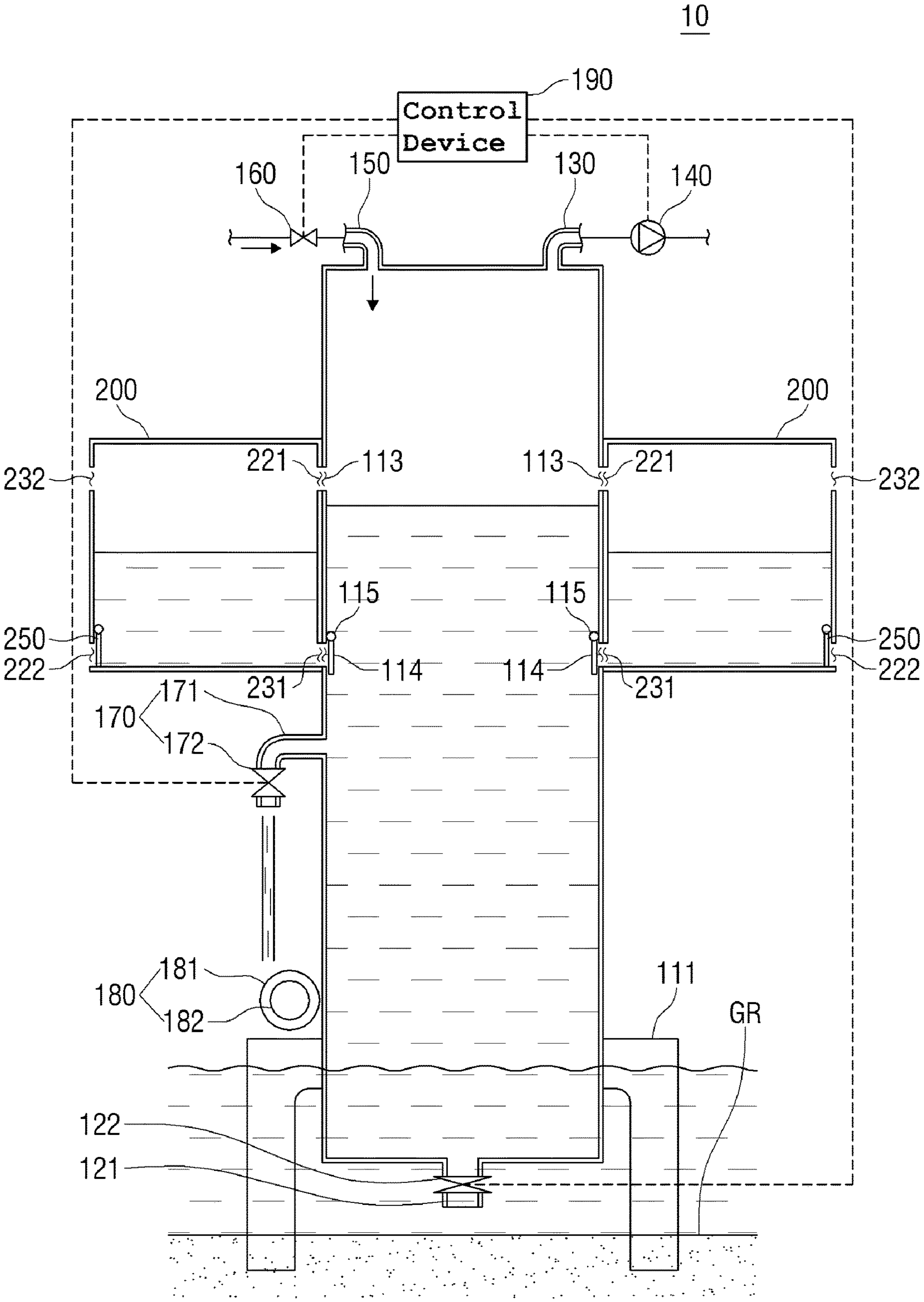
FIGS. 12 and 13 are diagrams showing a state in which power is generated by the power generation device.
Figure 13:
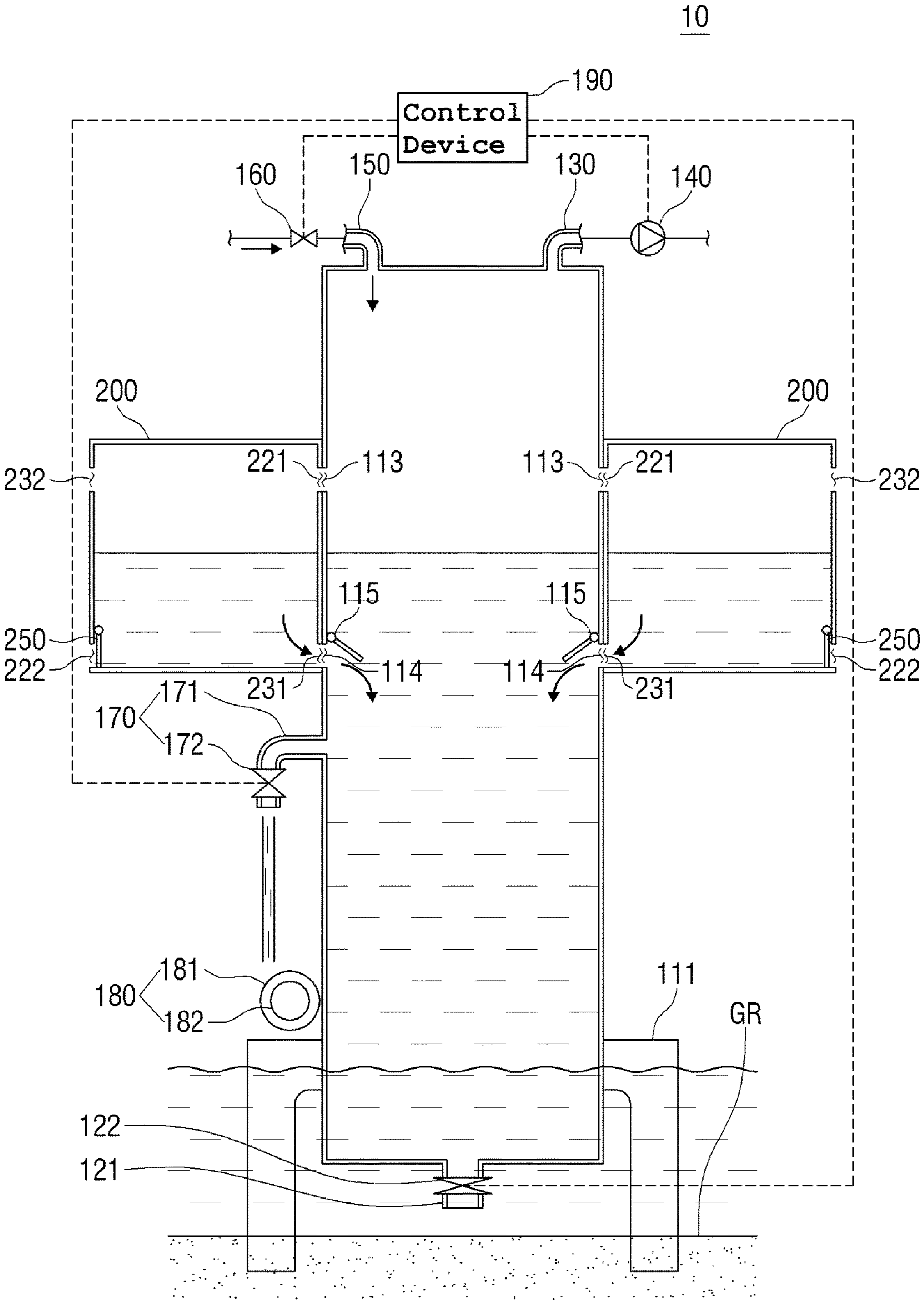

FIGS. 12 and 13 are diagrams showing a state in which power is generated by the power generation device.

Referring to FIGS. 12 and 13, the generator 10 may generate power. For the generation of power, the control device 190 may control the suction valve 122, the inlet valve 160, and the spout adjustment unit 172. The inlet valve 160 may open the inlet pipe 150, and the spout adjustment unit 172 may open the spout pipe 171. In this case, in order to prevent the outflow of water through the suction pipe 121, the suction valve 122 may close the suction pipe 121.

Water spouted from the spout pipe 171 may fall and reach the rotation unit 181 of the power generation unit 180. The rotation unit 181 is rotated by the falling water, and the rotational force of the rotating unit 181 may be transmitted to the power generating unit 182. The power generation unit 182 may convert the transmitted rotational force into electric power. The amount of power produced by the power generation unit 182 may vary depending on the degree of opening of the spout pipe 171 adjusted by the spout adjustment unit 172.

For the generation of power, water in the main chamber 110 may first be used, and then water in the auxiliary chamber 200 may be used. As shown in FIG. 12, when the level of water accommodated in the main chamber 110 is higher than the level of water accommodated in the auxiliary chamber 200, only the water accommodated in the main chamber 110 may be used for the generation of power. Meanwhile, as shown in FIG. 13, when the level of water accommodated in the main chamber 110 becomes equal to the level of water accommodated in the auxiliary chamber 200, the pressure of the main chamber 110 and the pressure of the auxiliary chamber 200 become the same, and the main opening/closing parts 115 may open the main inlets 114. Due to this, water in the auxiliary chamber 200 may be introduced into the main chamber 110 through the main inlet 114 of the main chamber 110 and the first auxiliary outlet 231 of the auxiliary chamber 200, and the introduced water may be used to generate electricity.

Figure 14:
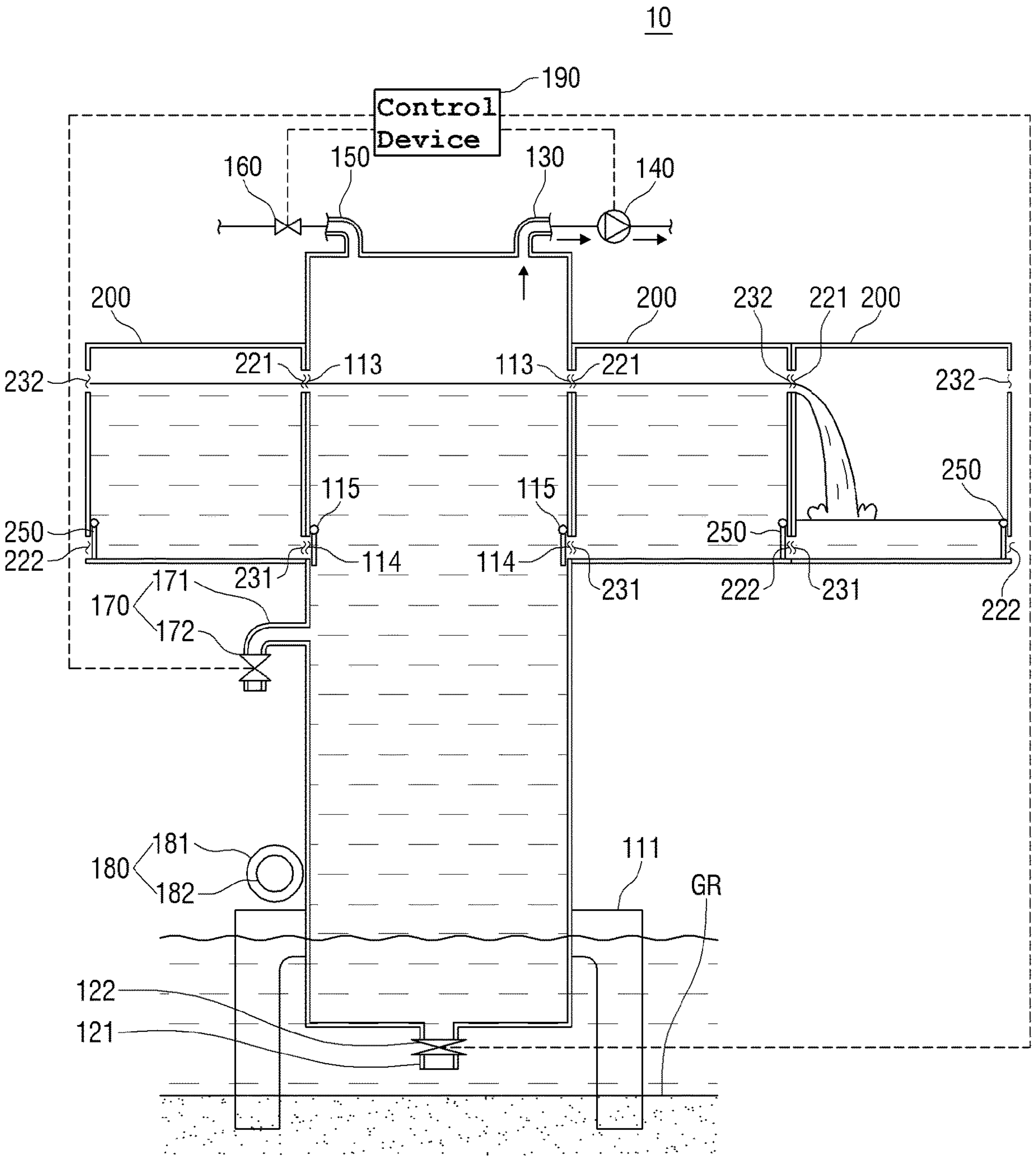
FIG. 14 is a diagram illustrating a state in which water is supplied from an auxiliary chamber to another auxiliary chamber.

FIG. 14 is a diagram illustrating a state in which water is supplied from an auxiliary chamber to another auxiliary chamber.

Referring to FIG. 14, water in the first auxiliary chamber 200 may supplied to the second auxiliary chamber 200 through the main outlet 113 of the first auxiliary chamber 200 and the auxiliary inlet of the second auxiliary chamber 200.

When the surface of the water accommodated in the first auxiliary chamber 200 reaches the first auxiliary outlets 231, the water in the first auxiliary chamber 200 may be supplied to the second auxiliary chamber 200. Even while the water in the first auxiliary chamber 200 is supplied to the second auxiliary chamber 200, the internal pressure of the first auxiliary chamber 200 is higher than the external pressure based on the second auxiliary inlet 222, so that the auxiliary opening/closing part 250 may keep the second auxiliary inlet 222 closed.

As described above, when water is sucked through the suction pipe 121, the sucked water may primarily be accommodated in the main chamber 110, and may then be accommodated in the first auxiliary chamber 200 coupled to the main chamber 110. Furthermore, when the level of water accommodated in the first auxiliary chamber 200 reaches the second auxiliary outlet 232, water may be accommodated in the second auxiliary chamber 200 coupled to the first auxiliary chamber 200. That is, the auxiliary chamber 200 located closer to the main chamber 110 may receive water preferentially. Due to this, load may be preferentially exerted on the auxiliary chamber 200 closer to the main chamber 110. In other words, a case in which the load of the auxiliary chamber 200 farther from the main chamber 110 is higher than that of the auxiliary chamber 200 closer to the main chamber 110 may be prevented, and thus the posture of the power generation device 10 can be maintained in a balanced manner.

Figure 15:
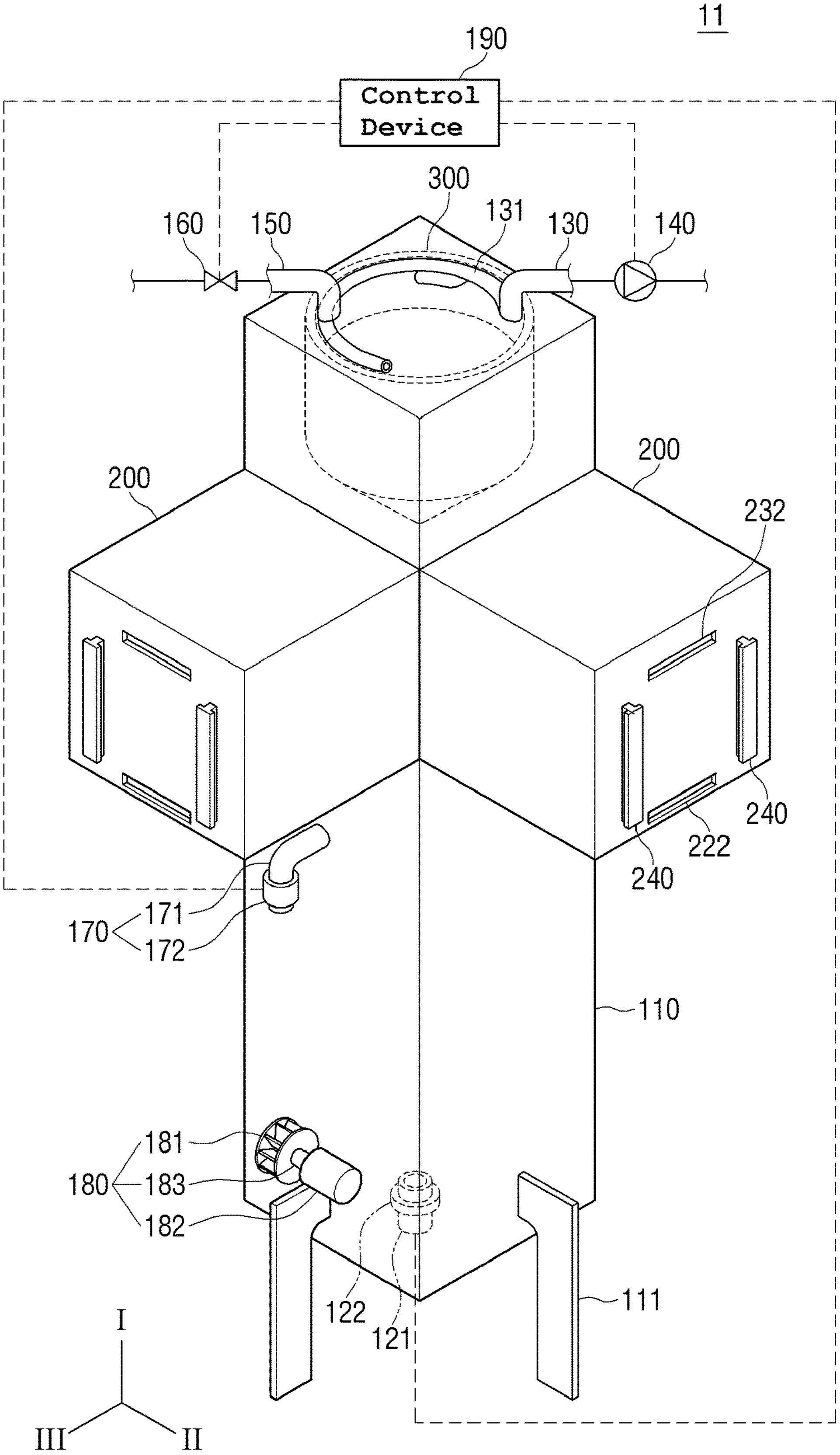
FIGS. 15 and 16 are diagrams showing a power generation apparatus according to another embodiment of the present invention.
Figure 16:
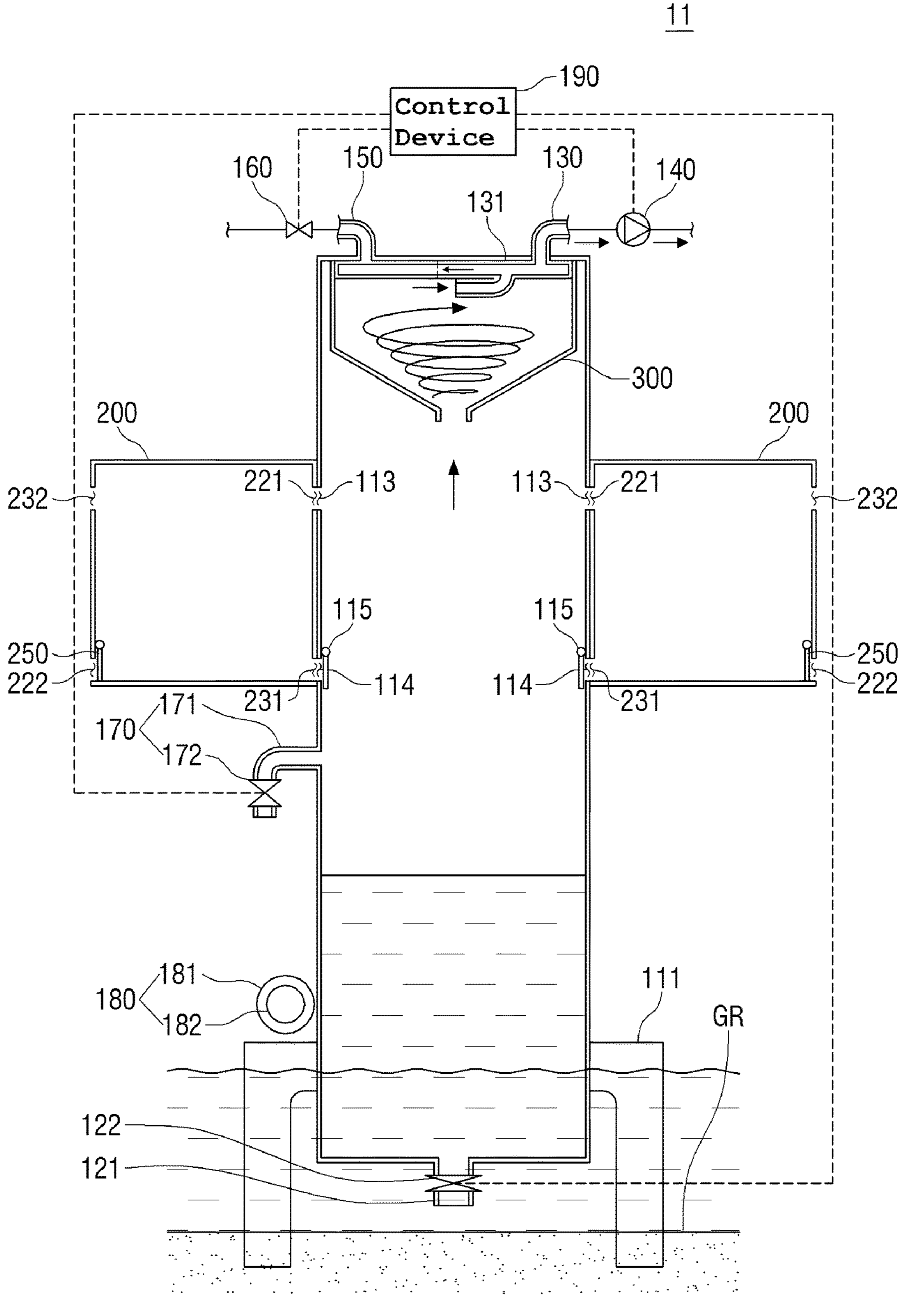

Meanwhile, when although not shown, the level of water accommodated in the first auxiliary chamber 200 closer to the main chamber 110 becomes equal to the level of water accommodated in the second auxiliary chamber 200 farther from the main chamber 110, the pressure of the first auxiliary chamber 200 and the pressure of the second auxiliary chamber 200 may become equal to each other, and the auxiliary opening/closing part 250 may open the second auxiliary inlet 222. Due to this, water in the second auxiliary chamber 200 may be introduced into the first auxiliary chamber 200 through the second auxiliary inlet 222 of the first auxiliary chamber 200 and the first auxiliary outlet 231 of the second auxiliary chamber 200. FIGS. 15 and 16 are diagrams showing a power generation apparatus according to another embodiment of the present invention.

Referring to FIGS. 15 and 16, the power generation apparatus 11 according to the present embodiment of the present invention may further include a vortex generation part 300 compared to the power generation device 10 shown in FIG. 1.

The vortex generation part 300 is disposed adjacent to the discharge pipe 130, and serves to cause air in the main space to generate a vortex and flow into the discharge pipe 130. The vortex generation part 300 may be generally provided in a cone shape. Air in the main space is introduced into the vortex generation part 300 through an air inlet provided in the vortex generation part 300, which generates a vortex that spreads from the narrow entrance of the cone-shaped vortex generation part 300 to the wide edge thereof.

In order to more smoothly generate a vortex, the discharge pipe 130 may include an extension portion 131 extending in the direction of the edge wing of a vortex. A vortex may be generated by the vortex generation part 300 when the sufficient suction force of air is provided by the vacuum pump 140. As the vortex is generated, the air accommodated in the main chamber 110 may be discharged more smoothly.

Figure 17:
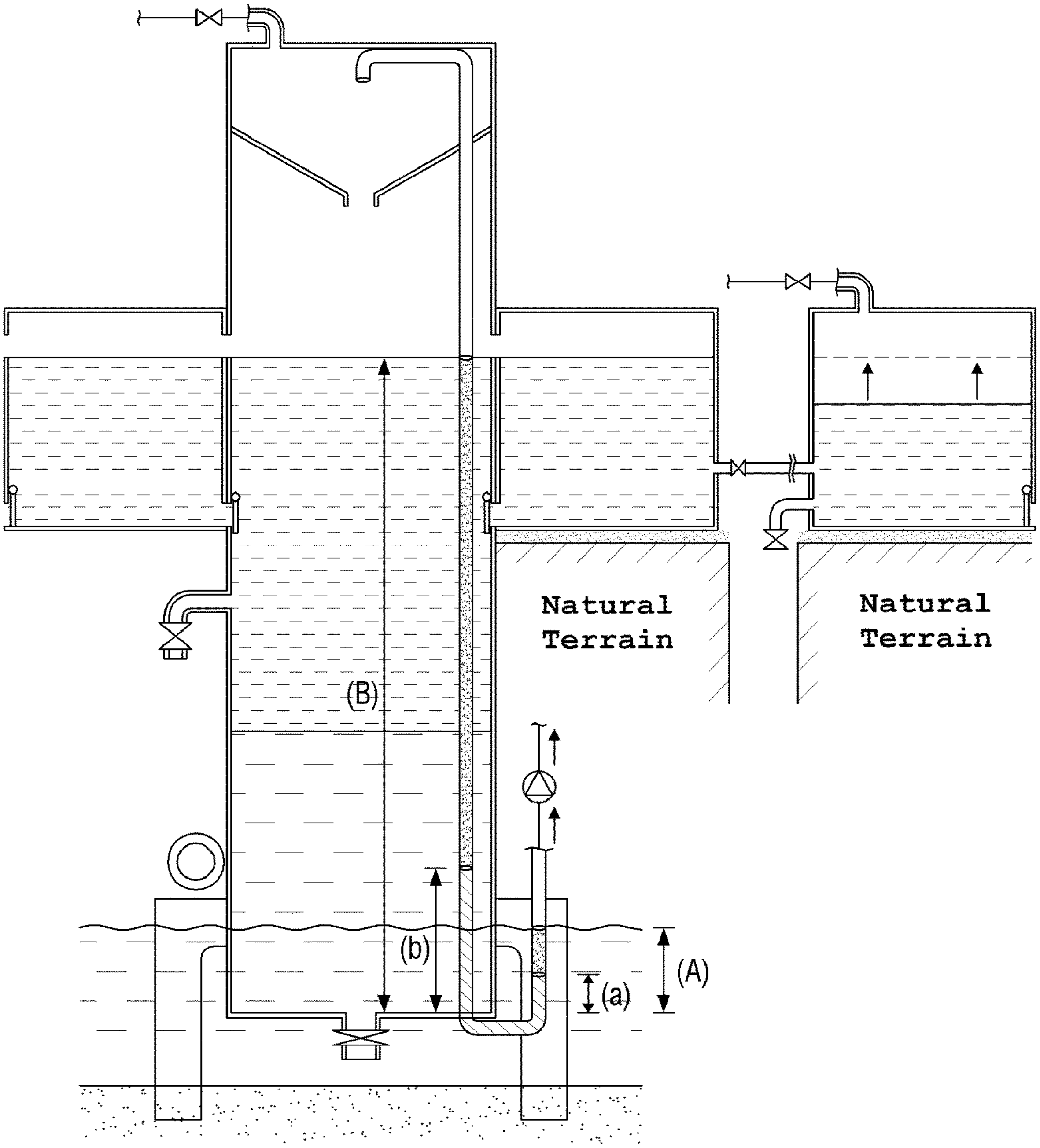
FIGS. 17 to 19 are diagrams showing a power generation device according to still another embodiment of the present invention.
Figure 18:
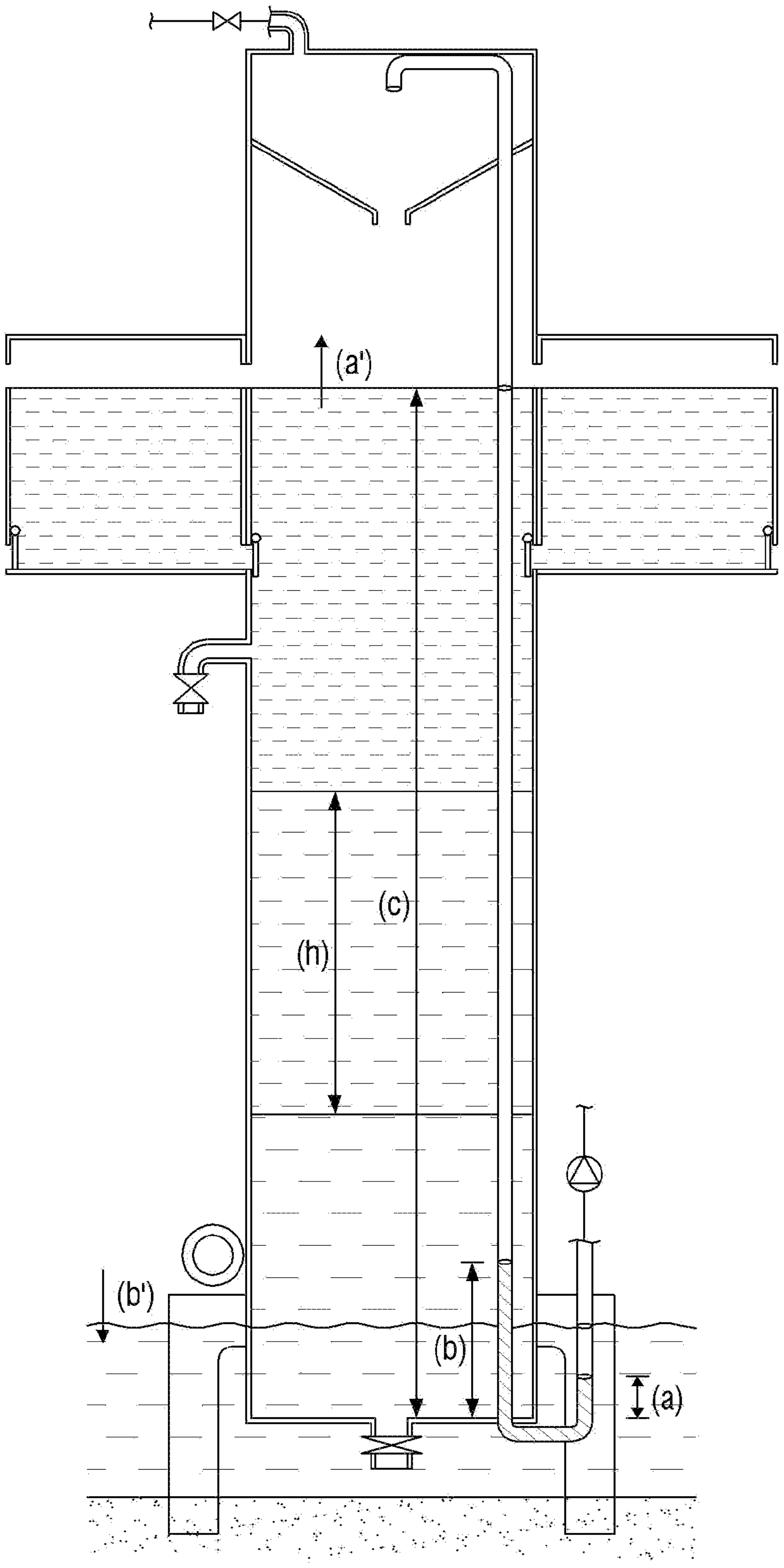
Figure 19:
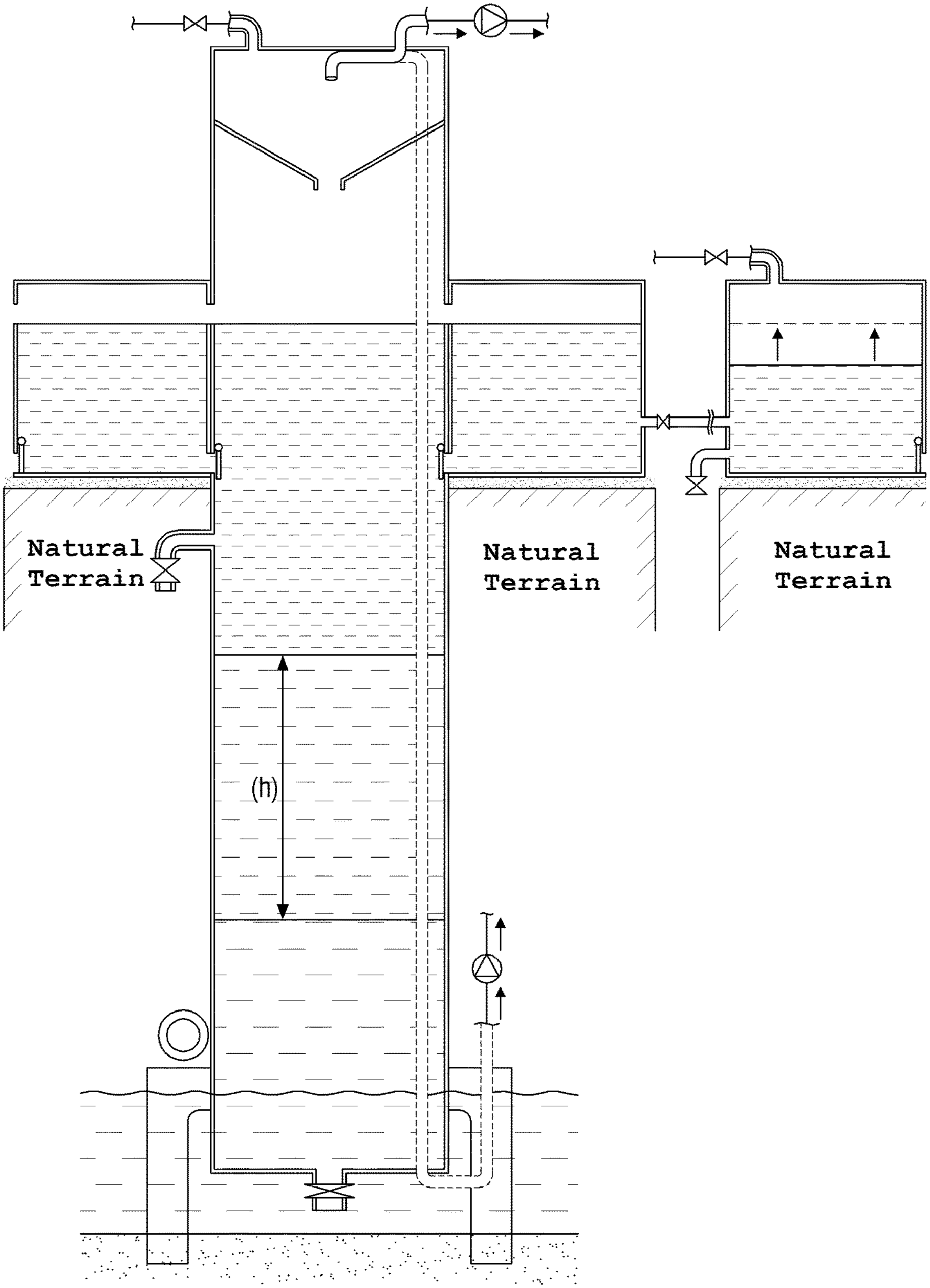

FIGS. 17 to 19 are diagrams showing a power generation device according to still another embodiment of the present invention.

Referring to FIGS. 17 to 19, the power generation apparatus according to the present embodiment of the present invention may further include an auxiliary power generation part configured to generate power by drawing water in an auxiliary chamber to a distant high location compared to the main power generation apparatus shown in FIG. 1.

Referring to FIG. 17, the remote drawing auxiliary power generation part may be installed at a remote high location having a height similar to that of the auxiliary chamber of the main power generation apparatus and installed having advantages in terms of a consumption place or natural terrain. The auxiliary power generation apparatus is connected to a passage for the reception of water from the auxiliary chamber to the auxiliary power generation apparatus, and further includes an opening/closing part configured to control the movement of water through the passage.

The chamber of the auxiliary power generation apparatus has the same shape as the auxiliary chamber of the main power generation apparatus. The inflow of water does not depend on the operation of the vacuum pump at the air outlet, but the water stored in the auxiliary chamber is supplied to generate power. The water in the auxiliary power generation apparatus may be filled upward up to the height of the auxiliary chamber by the pressure of the water in the auxiliary chamber. The inflow passage of water needs to be located at a location higher than the sprout hole. When the auxiliary power generation apparatus does not generate power, all control devices are closed. When water is introduced, the air inlet and the water inlet passage of the main power generation apparatus and the air inlet present at the top of the auxiliary power generation apparatus are opened, and the sprout hole is closed. During the generation of power, the water inlet passage is closed, and the air inlet and the sprout hole are opened. In this case, when the water level of the auxiliary chamber is higher than the water level of the chamber of the auxiliary power generation apparatus, the generation of power may be continued by opening the air inlet, the water inlet passage, and the sprout hole of the main power generation apparatus.

The inflow of water into the auxiliary power generation apparatus may be repeatedly performed by opening the air inlet of the main power generation apparatus and the air inlet and water inflow passage of the auxiliary generator and closing the sprout hole.

Meanwhile, the main power generation apparatus may be installed high in order to install the remote auxiliary power generation apparatus at a high location.

When the main power generation apparatus is installed high, the air outlet installed in the upper part of the main power generation apparatus may be installed below the chamber as shown in the drawing to observe how the water level inside the chamber changes with respect to the pressure of the air outlet. In this case, it can be seen that the water level (B) inside the chamber stops while being in pressure balance with the level (B) of the water filled in the air discharge pipe inside the chamber and the level (A) of the water filled in the air discharge pipe outside the chamber. Furthermore, it can be seen that the water level (B) inside the chamber stops while being in pressure balance with the water level (b) filled in the air discharge pipe inside the chamber and the water level (a) filled in the air discharge pipe outside the chamber even when the water level in the air discharge pipe is low, as in the case of the water level (b) filled in the air discharge pipe inside the chamber and the water level (a) filled in the air discharge pipe outside the chamber. As shown below, it can be seen that the water level (B) inside the chamber stops while being in pressure balance with the lower water level in the air discharge pipe even when the water level (B) inside the chamber is higher.

Referring to FIG. 18, in the case where even when the original height of water inside the main power generation apparatus and the chamber is increased by (h) for the stopped pressures (a) and (b) of the air discharge pipe, the size of the space inside the sealed chamber increases, and thus air suction pressure does not become higher, it can be seen that a stop balance is formed therebetween. In the case where a stop balance is formed as shown above, when the main power generation apparatus is installed high, the internal water level may be increased to the above state. When the auxiliary power generation apparatus is installed at a high location having advantageous natural terrain, the power generation water head of the auxiliary power generation apparatus may be increased. The increased pressure attributable to an increase in the water level in the chamber of the main power generation apparatus may be supported by reinforcing the bottom surface and the support part.

Meanwhile, referring to FIG. 18, when the water (a) in the tube outside the chamber ascends, the water (b) in the tube inside the chamber descends. The water level inside the chamber ascends in the direction of (a') accordingly, and the base water level of a river or stream descends in the direction of (b'). These series of ascending and descending actions are associated with each other through a closed space, and the ascending action at the low location (a) outside the chamber may be associated with the ascending action at the high location (a') inside the chamber accordingly.

Referring to FIG. 19, in this drawing, an air discharge device having been installed below the main power generation apparatus is installed above the main power generation apparatus as in the original shape, and the same air pressure action may be performed except that the location and length of the air discharge pipe are changed. The auxiliary chamber of the main power generation apparatus or the installation of the auxiliary power generation apparatus may be supported using advantageous natural terrain such as bedrock or the foot of a mountain. When the amount of water sent from the main power generation apparatus to the auxiliary power generation apparatus is large or water is sent from the main power generation apparatus to the auxiliary power generation apparatus frequently, a river or a beach having abundant water sources may be used. In this case, a connection passage for sending water may be securely reinforced by burying or the like.

Although the embodiments of the present invention have been described with reference to the accompanying drawings above, it will be understood by those having ordinary skill in the art to which the present invention pertains that the present invention may be embodied in other specific forms without departing from the technical spirit or essential features thereof. Therefore, the embodiments described above should be understood as illustrative and not limiting in all respects.

The invention claimed is:

1. A power generation apparatus comprising:

a main chamber provided with a main space for accommodation of water and air, and configured to accommodate water sucked through a suction pipe on a bottom surface thereof;

an inlet pipe for providing a path for external air to flow into the main space of the main chamber, the inlet pipe being provided on a first portion of a ceiling surface of the main chamber and comprising an inlet valve to selectively open and close the inlet pipe;

a support part mounted at the main chamber and configured such that a bottom surface of the main chamber is kept separated from a ground by a predetermined distance when the support part is fixed to the ground at a point where river water or stream water is located, so that the bottom surface of the main chamber and the suction pipe are placed below a water surface of the river water or stream water;

a first auxiliary chamber supported by the main chamber, provided with an auxiliary space for accommodation of water, and configured to receive water from the main chamber or to supply water to the main chamber;

a vacuum pump configured to discharge the air in the main space out of the main chamber through a discharge pipe provided on a second portion of the ceiling surface of the main chamber with the inlet valve closed, wherein the river water or stream water is sucked in through the suction pipe by a lowered pressure of the main chamber by the vacuum pump;

a vortex generation part disposed adjacent to the discharge pipe and configured to cause the air in the main space to generate a vortex and flow into the discharge pipe, wherein the vortex generation part comprises a cone-shaped portion and an air inlet provided at a vertex portion of the cone-shaped portion, wherein the discharge pipe comprises an extension portion disposed on a top inside portion of the vortex generation part and extending in a circumferential direction of the vortex generation part;

a spout part provided on a side surface of the main chamber, and configured to spout the water, sucked through the suction pipe and accommodated in the main space, out of the main chamber; and a power generation part configured to generate electric power using pressure of water spouted by the spout part.

2. The power generation apparatus of claim 1, wherein:

the main chamber comprises:

a main outlet configured to supply water to the first auxiliary chamber; and a main inlet configured to receive water from the first auxiliary chamber; and the main outlet is disposed above the main inlet.

3. The power generation apparatus of claim 2, wherein the first auxiliary chamber comprises:

a first auxiliary inlet connected to the main outlet and configured to receive water from the main chamber; and a first auxiliary outlet connected to the main inlet and configured to supply water to the main chamber.

4. The power generation apparatus of claim 2, wherein the main chamber further comprises a main opening/closing part configured to allow movement of water from an outside of the main chamber to an inside of the main chamber through the main inlet but block movement of water from the inside of the main chamber to the outside of the main chamber through the main inlet.

5. The power generation apparatus of claim 1, further comprising a second auxiliary chamber configured to be coupled to the first auxiliary chamber, wherein the first auxiliary chamber comprises:

a second auxiliary outlet configured to supply water to the second auxiliary chamber; and a second auxiliary inlet configured to receive water from the second auxiliary chamber; and the second auxiliary outlet is disposed above the second auxiliary inlet.

6. The power generation apparatus of claim 5, wherein the first auxiliary chamber further comprises an auxiliary opening/closing part configured to allow movement of water from an outside of the first auxiliary chamber to an inside of the first auxiliary chamber through the second auxiliary inlet but to block movement of water from the inside of the first auxiliary chamber to the outside of the first auxiliary chamber through the second auxiliary inlet.

* * * * *